United States Patent
Jin et al.

(10) Patent No.: US 11,211,897 B2
(45) Date of Patent: Dec. 28, 2021

(54) PHOTOVOLTAIC MODULE

(71) Applicant: LG ELECTRONICS INC., Seoul (KR)

(72) Inventors: Kanghwan Jin, Seoul (KR); Sunho Yu, Seoul (KR); Kanghwi Kim, Seoul (KR); Daihyun Kim, Seoul (KR); Yesl Shin, Seoul (KR); Hyeonggu Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/192,390

(22) Filed: Nov. 15, 2018

(65) Prior Publication Data

US 2019/0149086 A1 May 16, 2019

(30) Foreign Application Priority Data

| Nov. 15, 2017 | (KR) | 10-2017-0152514 |
| Nov. 28, 2017 | (KR) | 10-2017-0160840 |
| Oct. 31, 2018 | (KR) | 10-2018-0132375 |

(51) Int. Cl.
*H01L 31/044* (2014.01)
*H02S 40/32* (2014.01)
(Continued)

(52) U.S. Cl.
CPC ............ *H02S 40/32* (2014.12); *H02J 3/385* (2013.01); *H02M 1/14* (2013.01);
(Continued)

(58) Field of Classification Search
CPC ................ H01L 31/00–078; Y02E 10/50–60
(Continued)

(56) References Cited

U.S. PATENT DOCUMENTS

2011/0298305 A1* 12/2011 Chisenga ............. H02M 3/156
307/151
2014/0268958 A1* 9/2014 Chapman ................ H02J 3/46
363/97

(Continued)

FOREIGN PATENT DOCUMENTS

| JP | 2005-137197 A | 5/2005 |
| KR | 10-2005-0000773 A | 1/2005 |

(Continued)

OTHER PUBLICATIONS

Gaughan, "Pulse Width Modulated Inverters", Dublin Institute of Technology, Dec. 13, 2016, pp. 1-6 (7 pages).

*Primary Examiner* — Bach T Dinh
(74) *Attorney, Agent, or Firm* — Birch, Stewart, Kolasch & Birch, LLP

(57) ABSTRACT

A photovoltaic module can include a solar cell module including a plurality of solar cells; a converter configured to convert a level of DC power input from the solar cell module; a DC-terminal capacitor configured to store DC power output from the converter; an inverter including a plurality of switching elements and configured to convert DC power from the DC-terminal capacitor into AC power; and a controller configured to control the inverter, in which the converter controls some switching elements among of the plurality of switching elements included in the inverter to perform switching at a third switching frequency, and controls other switching elements among the plurality of switching elements included in the inverter to perform switching at a forth switching frequency higher than the third switching frequency.

15 Claims, 20 Drawing Sheets

(51) Int. Cl.
  *H02S 40/38* (2014.01)
  *H02S 40/34* (2014.01)
  *H02J 3/38* (2006.01)
  *H02M 7/5387* (2007.01)
  *H02M 1/14* (2006.01)
  *H02M 3/335* (2006.01)
  *H02M 1/44* (2007.01)
  *H02M 1/00* (2006.01)

(52) U.S. Cl.
  CPC ... *H02M 3/33592* (2013.01); *H02M 7/53871* (2013.01); *H02S 40/34* (2014.12); *H02S 40/38* (2014.12); *H02M 1/0058* (2021.05); *H02M 1/44* (2013.01)

(58) Field of Classification Search
  USPC .................................................. 136/243–265
  See application file for complete search history.

(56) References Cited

U.S. PATENT DOCUMENTS

| | | | |
|---|---|---|---|
| 2016/0211765 A1* | 7/2016 | Han | H02M 7/48 |
| 2017/0269168 A1* | 9/2017 | Lung | H02J 3/383 |
| 2019/0036481 A1* | 1/2019 | Chapman | H02M 3/158 |

FOREIGN PATENT DOCUMENTS

| | | |
|---|---|---|
| KR | 10-2015-0094130 A | 8/2015 |
| KR | 10-2015-0115561 A | 10/2015 |

* cited by examiner

PHOTOVOLTAIC MODULE

CROSS-REFERENCE TO RELATED APPLICATION

This application claims the benefit of priority to Korean Patent Application Nos. 10-2017-0152514 filed in the Republic of Korea on Nov. 15, 2017, 10-2017-0160840 filed in the Republic of Korea on Nov. 28, 2017, and 10-2018-0132375 filed in the Republic of Korea on Oct. 31, 2018, the entireties of all these applications are incorporated herein by reference.

BACKGROUND OF THE INVENTION

1. Field of the Invention

The present invention relates to a photovoltaic module, and more specifically, to a photovoltaic module having a power conversion device which can be reduced in size.

2. Description of the Related Art

A photovoltaic module refers to solar cells connected in series or parallel for photovoltaic power generation.

A power conversion device of a photovoltaic module may perform maximum power point tracking control, convert DC power from solar cells into AC power, and output AC power. Research into such a power conversion device is conducted in various manners.

SUMMARY OF THE INVENTION

Therefore, the present invention has been made in view of the above problems, and it is an object of the present invention to provide a photovoltaic module having a power conversion device which can be reduced in size.

Another object of the preset invention is to provide a photovoltaic module capable of performing power conversion with high voltage step-up and high efficiency.

Another object of the present invention is to provide a photovoltaic module capable of reducing the size of a converter.

In accordance with an aspect of the present invention, the above and other objects can be accomplished by the provision of a photovoltaic module including a solar cell module including a plurality of solar cells; a converter to convert the level of DC power input from the solar cell module; a DC-terminal capacitor to store DC power output from the converter; an inverter including a plurality of switching elements and configured to convert DC power from the DC-terminal capacitor into AC power; and a controller to control the inverter, in which the converter controls some of the plurality of switching elements included in the inverter to perform switching at a third switching frequency and controls others to perform switching at a forth switching frequency higher than the third switching frequency.

The photovoltaic module further comprises a filter for filtering the AC power output from the inverter.

The filter includes an inductor connected to one of output terminals of the inverter, and a capacitor connected between the inductor and the other output terminal of the inverter.

The some of the plurality of switching elements and the other switching elements are switching elements of different types.

The some of the plurality of switching elements include metal-oxide-semiconductor field-effect-transistors (MOSFETs), and the other switching elements include GaN transistors or SiC transistors.

The controller performs asynchronous PWM control on the inverter.

The controller includes a current controller for outputting a DC-terminal voltage command based on an output current flowing through the inverter; a voltage command compensator for compensating for a voltage command based on the DC-terminal voltage command and a voltage across both terminals of the DC-terminal capacitor; a low-speed switching driving signal generator for outputting a low-speed switching driving signal at the third switching frequency based on an output value from the voltage command compensator; and a high-speed switching driving signal generator for outputting a high-speed switching driving signal at the fourth switching frequency based on the output value from the voltage command compensator.

The converter includes a full-bridge switching unit for switching the DC power; a transformer having an input side connected to an output terminal of the full-bridge switching unit; and a synchronous rectification unit connected to an output side of the transformer; and a resonant capacitor and a resonant inductor connected between the transformer and the synchronous rectification unit.

The full-bridge switching unit includes first and second switching elements connected parallel; and third and fourth switching elements respectively connected in series to the first and second switching elements, in which the input side of the transformer is connected between a first node between the first and second switching elements and a second node between the third and fourth switching elements.

The controller controls the full-bridge switching unit to enter a buck mode and operate at a first switching frequency when a voltage of the DC-terminal capacitor is greater than or equal to a target voltage, and controls the full-bridge switching unit to enter a boost mode and operate at a second switching frequency lower than the first switching frequency when the voltage of the DC-terminal capacitor is lower than the target voltage.

The controller controls a phase difference between switching elements in the full-bridge switching unit to increase as a difference between the voltage of the DC-terminal capacitor and the target voltage increases when the voltage of the DC-terminal capacitor is greater than or equal to the target voltage.

The controller controls turn-on duty of switching elements in the synchronous rectification unit to increase as the difference between the voltage of the DC-terminal capacitor and the target voltage increases when the voltage of the DC-terminal capacitor is lower than the target voltage.

The inverter includes fifth and eighth switching elements connected in series; and sixth and seventh switching elements connected in series, in which the AC power is output through a fifth node between the fifth and eighth switching elements and a sixth node between the sixth and seventh switching elements.

The controller controls the fifth and eighth switching elements to operate at the fourth switching frequency and controls the sixth and seventh switching elements to operate at the third switching frequency.

The controller controls the fifth and eighth switching elements to perform switching according to PWM control while the sixth switching element is turned on and controls the eighth and fifth switching elements to perform switching according to PWM control while the seventh switching element is turned on.

The synchronous rectification unit includes ninth and tenth switching elements connected in series; and first and second capacitors connected in series, in which the output side of the transformer is connected between a third node between the ninth and tenth switching elements and a fourth node between the first and second capacitors.

The DC-terminal capacitor includes a film capacitor.

In accordance with another aspect of the present invention, there is provided a photovoltaic module that includes a solar cell module including a plurality of solar cells; a converter to convert the level of DC power input from the solar cell module; a DC-terminal capacitor to store DC power output from the converter; an inverter including first to fourth switching elements and configured to convert DC power from the DC-terminal capacitor into AC power; and a controller to control the inverter, in which the converter performs asynchronous PWM control on the inverter.

The controller controls the first and fourth switching elements to perform switching according to PWM control while the second switching is turned on and controls the fourth and first switching elements to perform switching according to PWM control while the third switching element is turned on.

In accordance with another aspect of the present invention, there is provided a photovoltaic module that includes a solar cell module including a plurality of solar cells; a converter for converting the level of DC power input from the solar cell module; a DC-terminal capacitor for storing DC power output from the converter; and a controller for controlling the converter, in which the converter includes a full-bridge switching unit for switching the DC power; a transformer having an input side connected to an output terminal of the full-bridge switching unit; a synchronous rectification unit connected to an output side of the transformer; and a resonant capacitor and a resonant inductor connected between the transformer and the synchronous rectification unit, and the controller varies a switching frequency of the full-bridge switching unit based on an input voltage of the converter or a voltage of the DC-terminal capacitor.

The controller controls the full-bridge switching unit and the synchronous rectification unit such that the full-bridge switching unit operates in a buck mode and the full-bridge switching unit and the synchronous rectification unit operate at a first switching frequency when the voltage of the DC-terminal capacitor is greater than or equal to a target voltage, and controls the full-bridge switching unit and the synchronous rectification unit such that the synchronous rectification unit operates in a boost mode and the full-bridge switching unit and the synchronous rectification unit operate at a second switching frequency lower than the first switching frequency when the voltage of the DC-terminal capacitor is lower than the target voltage.

The controller controls the full-bridge switching unit to operate at a maximum switching frequency and varies a phase difference between switching elements in the full-bridge switching unit in the buck mode.

The controller controls a phase difference between switching elements in the full-bridge switching unit to increase as a difference between the voltage of the DC-terminal capacitor and the target voltage increases when the voltage of the DC-terminal capacitor is greater than or equal to the target voltage.

The controller controls the full-bridge switching unit to operate at a minimum switching frequency and varies turn-on duty of switching elements in the synchronous rectification unit in the boost mode.

The controller controls the turn-on duty of the switching elements in the synchronous rectification unit to increase as the difference between the voltage of the DC-terminal capacitor and the target voltage increases when the voltage of the DC-terminal capacitor is lower than the target voltage.

The controller includes a ripple compensator for compensating for ripples in of the DC-terminal capacitor based on the detected DC-terminal voltage and the target voltage; and a pulse width modulation (PWM) controller for controlling a pulse width with respect to switching elements in the full-bridge switching unit based on the compensated ripples.

The controller controls ripples in the voltage of the DC-terminal capacitor to decrease.

The full-bridge switching unit includes first and second switching elements connected in parallel; and third and fourth switching elements respectively connected in series to the first and second switching elements, in which the input side of the transformer is connected between a first node between the first and second switching elements and a second node between the third and fourth switching elements.

The controller controls turn-on timing of the fourth and third switching elements to be delayed from turn-on timing of the first and second switching elements in the buck mode.

The controller controls the delay to increase as the difference between the voltage of the DC-terminal capacitor and the target voltage increases when the voltage of the DC-terminal capacitor is greater than or equal to the target voltage.

The controller controls the first and fourth switching elements and the second and third switching elements to be alternately turned on in the boost mode.

The photovoltaic module further includes an inverter for converting DC power from the DC-terminal capacitor into AC power, in which the inverter includes fifth and sixth switching elements connected in series; and seventh and eighth switching elements connected in series, in which the AC power is output through a fifth node between the fifth and sixth switching elements and a sixth node between the seventh and eighth switching elements.

The synchronous rectification unit includes ninth and tenth switching elements connected in series; and first and second capacitors connected in series, in which the output side of the transformer is connected between a third node between the ninth and tenth switching elements and a fourth node between the first and second capacitors.

The controller controls turn-on duty of the ninth and tenth switching elements to increase as the difference between the voltage of the DC-terminal capacitor and the target voltage increases when the voltage of the DC-terminal capacitor is lower than the target voltage.

The switching frequency of the full-bridge switching unit is higher than a system frequency.

In accordance with another aspect of the present invention, there is provided a photovoltaic module including a solar cell module including a plurality of solar cells; a converter for converting the level of DC power input from the solar cell module; a DC-terminal capacitor for storing DC power output from the converter; and a controller for controlling the converter, in which the converter comprises a full-bridge switching unit for switching the DC power; a transformer having an input side connected to an output terminal of the full-bridge switching unit; a synchronous rectification unit connected to an output side of the transformer; and a resonant capacitor and a resonant inductor connected between the transformer and the synchronous rectification unit, and in which the controller controls the full-bridge switching unit or the synchronous rectification unit to operate in a buck mode or a boost mode depending on a voltage level of the DC-terminal capacitor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

The present invention proposes a method for reducing ripples in current input to a converter in a photovoltaic module.

The present invention will be described in more detail with reference to the drawings.

The suffixes "module" and "unit" of elements herein are used for convenience of description and do not have any distinguishable meanings or functions. Accordingly, the suffixes "module" and "unit" can be used interchangeably.

Figure 1A:
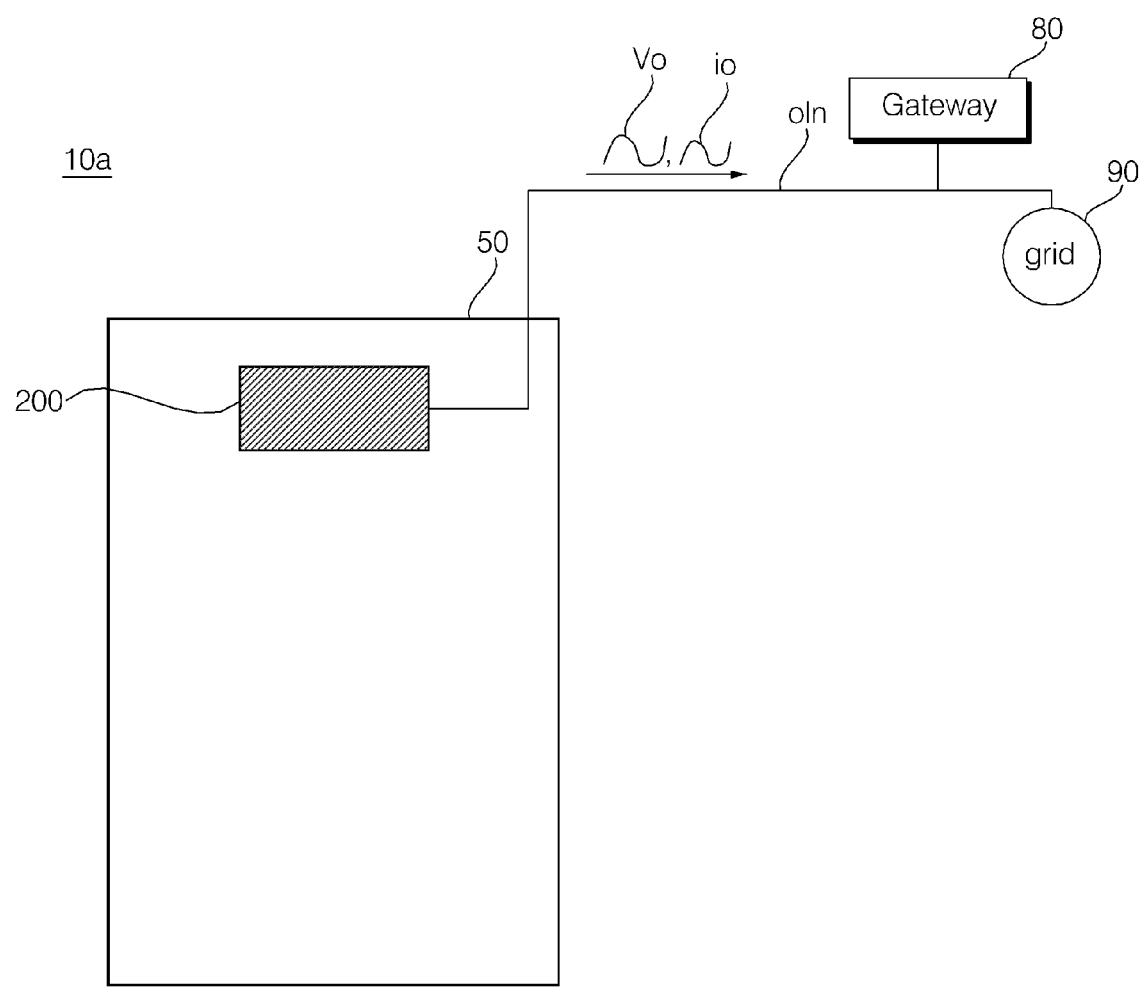
FIG. 1A is a diagram showing an example of a photovoltaic system including a photovoltaic module according to an embodiment of the present invention.

FIG. 1A is a diagram showing an example of a photovoltaic system including a photovoltaic module according to an embodiment of the present invention.

Referring to FIG. 1A, a photovoltaic system 10a according to an embodiment of the present invention may include a photovoltaic module 50 and a gateway 80.

The photovoltaic module 50 may integrally include a solar cell module 100 and a junction box 200 including a power conversion device (500 in FIG. 4) which converts DC power in the solar cell module and outputs the converted power.

Although the junction box 200 is attached to the rear side of the solar cell module 100 in the figure, the present invention is not limited thereto. The junction box 200 can be separate from the solar cell module 100.

A cable oln for supplying AC power output from the junction box 200 to a grid 90 may be electrically connected to an output terminal of the junction box 200.

The gateway 80 can be positioned between one or more power conversion devices and the grid 90. The gateway 80 can detect an alternating current (AC) io and an AC voltage vo output from the photovoltaic module 50 through the cable oln. The gateway 80 may output a power factor adjustment signal for power factor adjustment based on a phase difference between the AC io and the AC voltage vo output from the photovoltaic module 50. Thus, the gateway 80 and the photovoltaic module 50 can perform power line communication (PLC) using a cable 323 (e.g., see FIG. 2).

The power conversion device (500 in FIG. 4) included in the photovoltaic module 50 may convert DC power output from the solar cell module 100 into AC power and output the AC power. Thus, the power conversion device (500 in FIG. 4) in the photovoltaic module 50 may include a converter (530 in FIG. 6) and an inverter (540 in FIG. 4).

The power converter (500 in FIG. 4) can be referred to as a micro-inverter. Accordingly, the micro-inverter can include a converter (530 in FIG. 4) and an inverter (540 in FIG. 4).

In embodiments of the present invention, a 2-stage power conversion device, which converts the level of DC power output from the solar cell module 100 through the converter 530, is included in the power conversion device (500 in FIG. 4) or the micro-inverter, and then performs AC power conversion through the inverter 540 is described.

The present invention proposes a method for performing power conversion with high voltage step-up and high efficiency through the converter 530.

Thus, the photovoltaic module 50 according to an embodiment of the present invention can include the solar cell module 100, the converter 530, and a controller 550. The photovoltaic module 50 according to an embodiment of the present invention may further include the inverter 540.

The converter 530 in the power conversion device 500 according to an embodiment of the present invention can include a full-bridge switching unit 532 that switches DC power, a transformer 536 having an input side connected to an output terminal of the full-bridge switching unit 532, a synchronous rectification unit 538 connected to an output side of the transformer 536, and a resonant capacitor Cr and a resonant inductor Lr which are connected between the transformer 536 and the synchronous rectification unit 538. The controller 550 can perform power conversion with high voltage step-up and high efficiency by varying a switching frequency of the full-bridge switching unit 532 and the synchronous rectification unit 538 which is a half-bridge switching unit based on the input voltage of the converter 530 or the voltage of a DC-terminal capacitor C.

Particularly, the controller 550 can control phase shift of the full-bridge switching unit 532 such that the full-bridge switching unit 532 operates in a buck mode and control the full-bridge switching unit 532 and the synchronous rectification unit 538 to operate at a first switching frequency when the voltage of the DC-terminal capacitor C is greater than or equal to a target voltage, and can control duty of the synchronous rectification unit 538 which is a half-bridge switching unit such that the synchronous rectification unit 538 operates in a boost mode and the full-bridge switching unit 532 and the synchronous rectification unit 538 operate at a second switching frequency lower than the first switching frequency when the voltage of the DC-terminal capacitor C is lower than the target voltage, thereby performing power conversion with high voltage step-up and high efficiency.

Here, the first and second switching frequencies can be much higher than a system frequency, and thus the sizes of circuit elements in the converter 530 can be reduced.

Particularly, the turn ratio of the transformer 536 can be reduced and thus the size of the transformer 536 can be decreased. Consequently, the size of the converter 530 used in the photovoltaic module 50 can be reduced.

Control is performed such that ripples in the voltage of the DC-terminal capacitor C are reduced, and thus a film capacitor instead of an electrolytic capacitor can be used as the DC-terminal capacitor C. Accordingly, the size of the DC-terminal capacitor C can be reduced.

When the voltage of the DC-terminal capacitor is greater than or equal to the target voltage, the full-bridge switching unit 532 can be controlled to enter the buck mode in which a phase difference between switching elements in the full-bridge switching unit 532 increases as the difference between the voltage of the DC-terminal capacitor and the target voltage increases such that the voltage of the DC-terminal capacitor follows the target voltage.

When the voltage of the DC-terminal capacitor is lower than the target voltage, the synchronous rectification unit 538 is controlled to enter the boost mode in which turn-on duty of switching elements in the synchronous rectification unit 538 increases as the difference between the voltage of the DC-terminal capacitor and the target voltage increases such that the voltage of the DC-terminal capacitor follows the target voltage.

In addition, the converter 530 in the power conversion device 500 according to another embodiment of the present invention can include the full-bridge switching unit 532 which switches DC power, the transformer 536 having an input side connected to the output terminal of the full-bridge switching unit 532, the synchronous rectification unit 538 connected to the output side of the transformer 536, and the resonant capacitor Cr and the resonant inductor Lr connected between the transformer 536 and the synchronous rectification unit 538. The controller 550 can control the full-bridge switching unit 532 to operate in the buck mode or boost mode depending on the voltage level of the DC-terminal capacitor C, thereby performing power conversion with high voltage step-up and high efficiency.

The inverter 540 in the power conversion device 500 according to an embodiment of the present invention includes a plurality of switching elements S1 to S4 and converts DC power from a DC-terminal capacitor C into AC power. Some of the plurality of switching elements S1 to S4 can perform switching at a third switching frequency and other switching elements can perform switching at a fourth switching frequency.

That is, the controller 550 can control some of the switching elements S1 to S4 to perform switching at the third switching frequency and control the other switching elements to perform switching at the fourth switching frequency.

Here, the third switching frequency can correspond to a system frequency and the fourth switching frequency can be higher than the system frequency.

Accordingly, high-speed switching is performed with respect to some switching elements in the inverter 540 and thus, not only the size of the inverter 540 but also the sizes of other circuit elements in the power conversion device can be reduced according to a high switching frequency.

The other switching elements among the switching elements S1 to S4 can include GaN transistors or SiC transistors and thus reverse recovery loss during high-speed switching can be reduced.

Further, a filter 570 provided at output terminals of the inverter 540 includes an inductor connected to one of the output terminals of the inductor 540 and a capacitor connected between the inductor and the other output terminal of the inverter 540. Accordingly, a common mode voltage at the output terminals of the inverter 540 can be reduced. Furthermore, a harmonic component THD of output current can be reduced.

The controller 550 can perform power conversion with high voltage step-up and high efficiency by varying a switching frequency of a full-bridge switching unit 532 based on the input voltage of the converter 530 or the voltage of the DC-terminal capacitor C.

Particularly, the controller 550 can control the full-bridge switching unit 532 to enter a buck mode and operate at a first switching frequency when the voltage of the DC-terminal capacitor C is greater than or equal to a target voltage, and the controller 550 can control the full-bridge switching unit 532 to enter a boost mode and operate at a second switching frequency lower than the first switching frequency when the voltage of the DC-terminal capacitor C is lower than the target voltage, thereby performing power conversion with high voltage step-up and high efficiency.

Here, the first and second switching frequencies can be much higher than the system frequency. Accordingly, the sizes of circuit elements in the converter 530 can be reduced.

Particularly, the turn ratio of a transformer 536 can be reduced, and thus the size of the transformer 536 can be decreased. Consequently, the size of the converter 530 used in the photovoltaic module 50 can be reduced.

Control is performed such that ripples in the voltage of the DC-terminal capacitor C are reduced, and thus a film capacitor instead of an electrolytic capacitor can be used as the DC-terminal capacitor C. Accordingly, the size of the DC-terminal capacitor C can be reduced.

When the voltage of the DC-terminal capacitor is greater than or equal to the target voltage, the full-bridge switching unit 532 can be controlled to enter the buck mode in which a phase difference between switching elements in the full-bridge switching unit 532 increases as the difference between the voltage of the DC-terminal capacitor and the target voltage increases such that the voltage of the DC-terminal capacitor follows the target voltage.

When the voltage of the DC-terminal capacitor is lower than the target voltage, a synchronous rectification unit 538 can be controlled to enter the boost mode in which turn-on duty of switching elements in the synchronous rectification unit 538 increases as the difference between the voltage of the DC-terminal capacitor and the target voltage increases such that the voltage of the DC-terminal capacitor follows the target voltage.

In addition, the converter 540 in the power conversion device 500 according to another embodiment of the present invention is driven according to asynchronous PWM. Accordingly, the sizes of circuit elements in the power conversion device can be reduced.

Figure 1B:
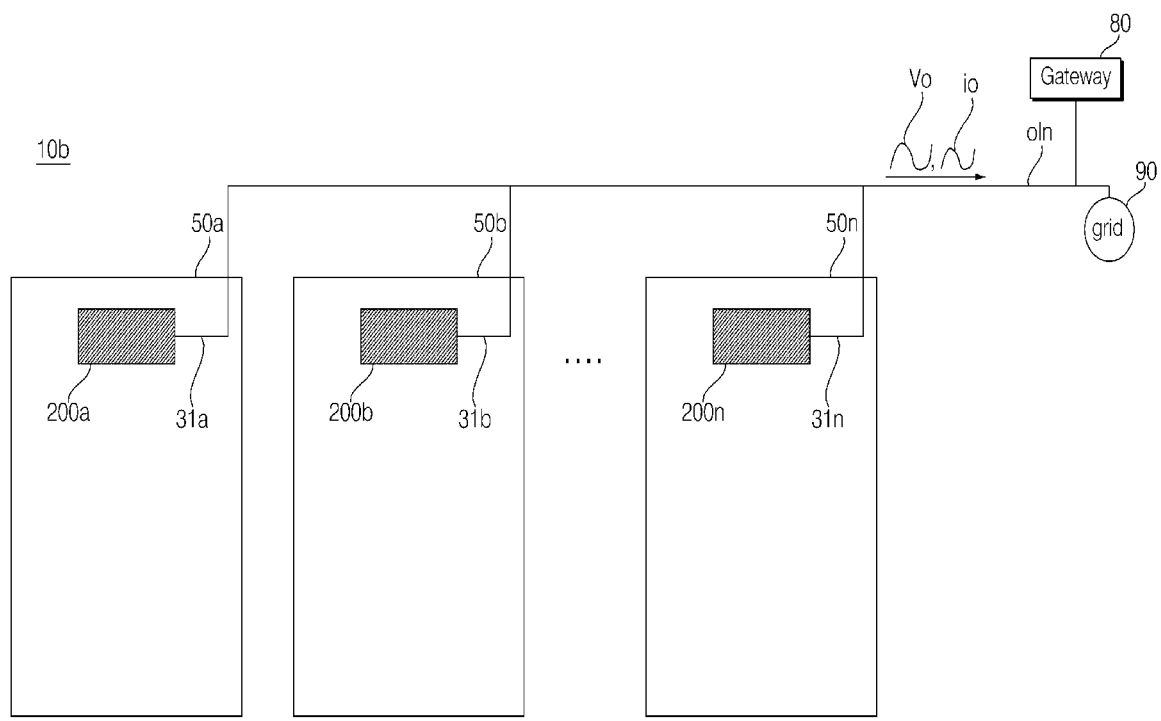
FIG. 1B is a diagram showing another example of a photovoltaic system including a photovoltaic module according to an embodiment of the present invention.

FIG. 1B is a diagram showing another example of a photovoltaic system including a photovoltaic module according to an embodiment of the present invention.

Referring to FIG. 1B, a photovoltaic system 10*b* according to an embodiment of the present invention can include a plurality of photovoltaic modules 50*a*, 50*b*, . . . , 50*n* and the gateway 80.

The photovoltaic system 10b of FIG. 1B differs from the photovoltaic system 10a of FIG. 1A in that the photovoltaic modules 50a, 50b, . . . , 50n are connected in parallel.

The photovoltaic modules 50a, 50b, . . . , 50n can respectively include solar cell modules 100a, 100b, . . . , 100n and junction boxes 200a, 200b, . . . , 200n including circuit elements for converting DC power in the solar cell modules and outputting the converted power.

Although the junction boxes 200a, 200b, . . . , 200n are respectively attached to the rear sides of the solar cell modules 100a, 100b, . . . , 100n in the figure, the present invention is not limited thereto. The junction boxes 200a, 200b, . . . , 200n can be separate from the solar cell modules 100a, 100b, . . . , 100n.

Further, cables 31a, 31b, . . . , oln for supplying AC power output from the junction boxes 200a, 200b, . . . , 200n to the grid 90 can be electrically connected to output terminals of the junction boxes 200a, 200b, . . . , 200n, respectively.

As described above with reference to FIG. 1A, the converter 530 in the power conversion device 500 included in each of the photovoltaic modules 50a, 50b, . . . 50n can include a full-bridge switching unit 532 which switches DC power, a transformer 536 having an input side connected to an output terminal of the full-bridge switching unit 532, a synchronous rectification unit 538 connected to an output side of the transformer 536, and a resonant capacitor Cr and a resonant inductor Lr which are connected between the transformer 536 and the synchronous rectification unit 538. The controller 550 can perform power conversion with high voltage step-up and high efficiency by varying a switching frequency of the full-bridge switching unit 532 and the synchronous rectification unit 538 which is a half-bridge switching unit based on the input voltage of the converter 530 or the voltage of a DC-terminal capacitor C.

In the inverter 540 included in the power conversion device 500 included in each of the photovoltaic modules 50a, 50b, . . . 50n shown in FIG. 1B, some of the switching elements S1 to S4 can perform switching at the third switching frequency and other switching elements can perform switching at the fourth frequency higher than the third switching frequency, as described above with reference to FIG. 1A. Accordingly, the size of the power conversion device can be reduced.

Particularly, since switching is performed at the third switching frequency corresponding to the system frequency and the fourth switching frequency higher than the third switching frequency, a high-speed switching effect is obtained and thus, not only the size of the inverter 540 but also the sizes of circuit elements in the power conversion device including the inverter 540 can be reduced.

Figure 2:
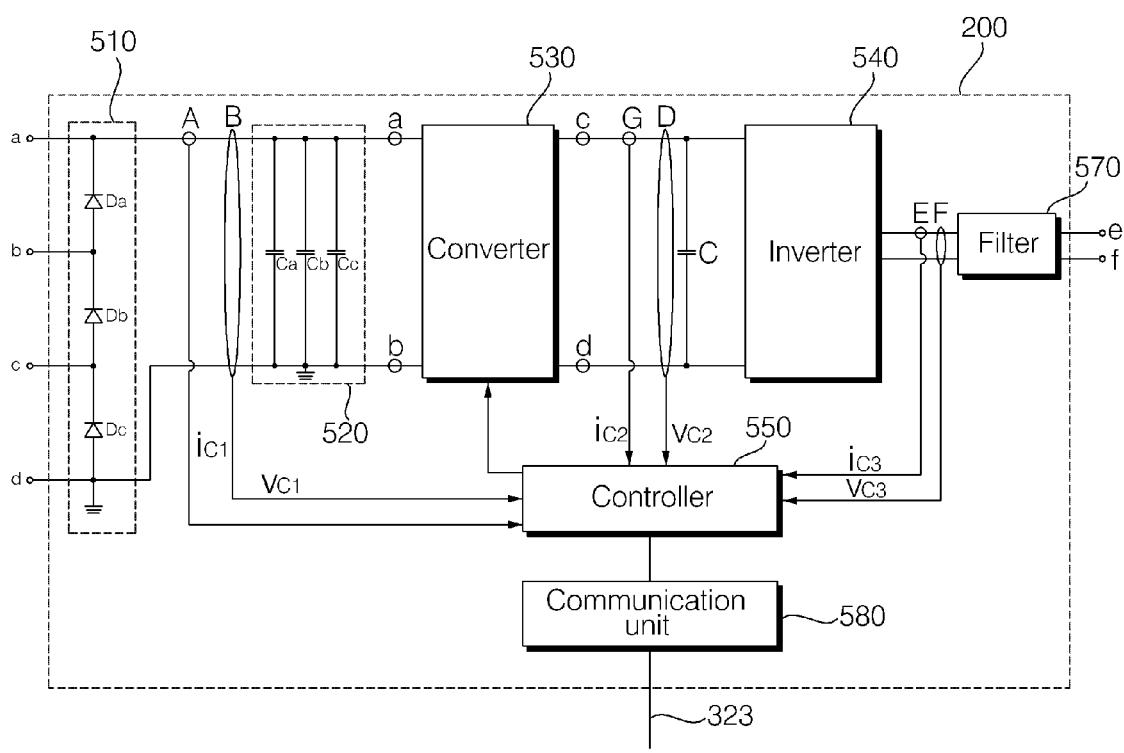
FIG. 2 is a diagram showing an internal circuit of the junction box in the photovoltaic module of FIG. 1A or FIG. 1B according to an embodiment of the present invention.

FIG. 2 is a diagram showing an internal circuit of the junction box in the photovoltaic module of FIG. 1A or FIG. 1B.

Referring to the figure, the junction box 200 can convert DC power from the solar cell module 100 and output the converted power.

Particularly, the junction box 200 according to an embodiment of the present invention can include the power conversion device (500 in FIG. 4) for outputting AC power.

Thus, the junction box 200 can include the converter 530, the inverter 540 and the controller 550 for controlling the same.

In addition, the junction box 200 can further include a bypass diode unit 510 for bypass, a capacitor unit 520 for storing DC power, and a filter 570 for filtering output AC power.

The junction box 200 can further include a communication unit 580 for communication with the external gateway 80.

In addition, the junction box 200 can further include an input current detector A, an input voltage detector B, a converter output current detector C, a converter output voltage detector D, an inverter output current detector E and an inverter output voltage detector F.

The controller 550 can control the converter 530, the inverter 540 and the communication unit 580.

The bypass diode unit 510 can include the bypass diodes Dc, Db and Da arranged between the first to fourth conductive lines of the solar cell module 100. Here, the number of bypass diodes is one or more, preferably, one less than the number of conductive lines.

The bypass diodes Dc, Db and Da receive photovoltaic DC power from the solar cell module 100, particularly, from the first to fourth conductive lines in the solar cell module 100. When a reverse voltage is generated in DC power from at least one of the first to fourth conductive lines, the bypass diodes Dc, Db and Da can bypass the DC power.

DC power which has passed through the bypass diode unit 510 can be input to the capacitor unit 520.

The capacitor unit 520 can store the DC power input through the solar cell module 100 and the bypass diode unit 510.

Although the figure shows that the capacitor unit 520 includes a plurality of capacitors Ca, Cb and Cc connected in parallel, a plurality of capacitors can be connected in series and parallel, or connected in series to a ground terminal. Alternatively, the capacitor unit 520 can include only one capacitor.

The converter 530 can convert the level of an input voltage from the solar cell module 100, which has passed through the bypass diode unit 510 and the capacitor unit 520. Particularly, the converter 530 can perform power conversion using DC power stored in the capacitor unit 520.

The converter 530 according to an embodiment of the present invention will be described in more detail with reference to FIG. 4.

Switching elements in the converter 530 can be turned on/off based on a converter switching control signal from the controller 550. Accordingly, level-converted DC power can be output.

The inverter 540 can convert the DC power converted by the converter 530 into AC power.

The figure shows a full-bridge inverter. That is, upper arm switching elements S1 and S3 connected in series and lower arm switching elements S2 and S4 connected in series are paired, and the two pairs of upper and lower arm switching elements S1, S2, S3 and S4 are connected in parallel. A diode can be connected in anti-parallel with each switching element S1 to S4.

The switching elements S1 to S4 in the inverter 540 can be turned on/off based on an inverter switching control signal from the controller 550. Accordingly, AC power having a predetermined frequency can be output. Desirably, AC power having the same frequency (e.g., about 60 Hz or 50 Hz) as the AC frequency of the grid is output.

The capacitor C can be disposed between the converter 530 and the inverter 540. The capacitor C can store the DC power having the level converted by the converter 530. Both terminals of the capacitor C can be referred to as DC terminals and thus the capacitor C can be referred to as a DC-terminal capacitor.

The input current detector A can detect input current ic1 supplied from the solar cell module 100 to the capacitor unit 520.

The input voltage detector B can detect an input voltage Vc1 supplied from the solar cell module 100 to the capacitor unit 520. Here, the input voltage Vc1 can be the same as the voltage stored in the capacitor unit 520.

The detected input current ic1 and input voltage vc1 can be input to the controller 550.

The converter output current detector C detects output current ic2 from the converter 530, that is, DC-terminal current, and the converter output voltage detector D detects an output voltage vc2 from the converter 530, that is, a DC-terminal voltage. The detected output current ic2 and output voltage vc2 can be input to the controller 550.

The inverter output current detector E detects current ic3 output from the inverter 540 and the inverter output voltage detector F detects a voltage vc3 output from the inverter 540. The detected current ic3 and voltage vc3 are input to the controller 550.

The controller 550 may output control signals for controlling the switching elements of the converter 530. Particularly, the controller 550 may output a turn-on timing signal of the switching elements included in the converter 530 based on at least one of the detected input current ic1, input voltage vc1, output current ic2, output voltage vc2, output current ic3 and output voltage vc3.

Further, the controller 550 can output inverter control signals for controlling the switching elements S1 to S4 of the inverter 540. Particularly, the controller 550 can output a turn-on timing signal of the switching elements S1 to S4 of the inverter 540 based on at least one of the detected input current ic1, input voltage vc1, output current ic2, output voltage vc2, output current ic3 or output voltage vc3.

Further, the controller 550 can calculate a maximum power point with respect to the solar cell module 100 and control the converter 530 to output DC power corresponding to maximum power according thereto.

The communication unit 580 can perform communication with the gateway 80. For example, the communication unit 580 can exchange data with the gateway 80 through power line communication.

The communication unit 580 can transmit current information, voltage information and power information of the photovoltaic module 50 to the gateway 80.

The filter 570 can be disposed at the output terminals of the inverter 540. In addition, the filter 570 can include a plurality of passive elements and adjust a phase difference between an AC io and an AC voltage vo output from the inverter 540 based on at least some of the plurality of passive elements.

Figure 3A:
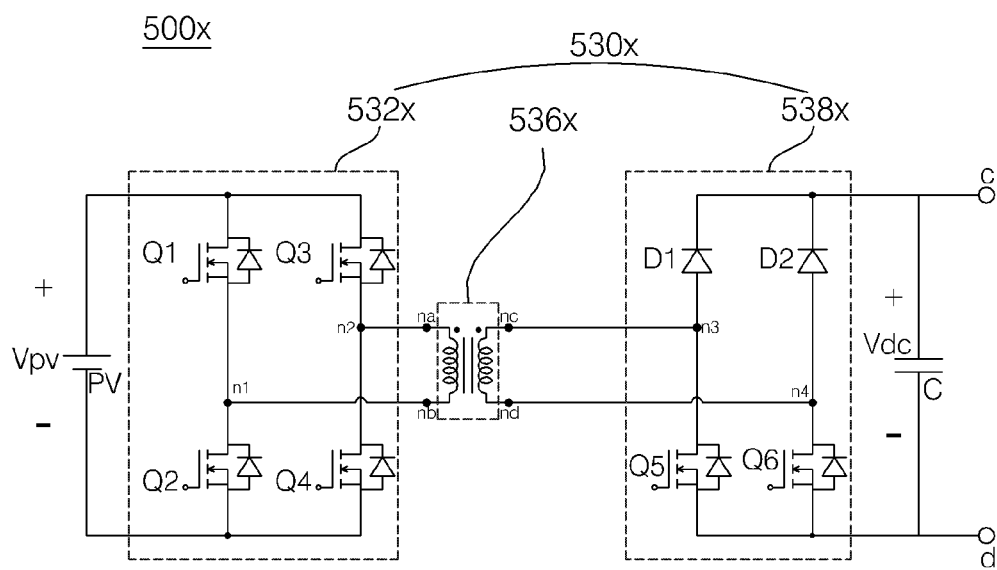
FIGS. 3A to 3B are a circuit diagram of a power conversion device included in a photovoltaic module related to the present invention.
Figure 3B:
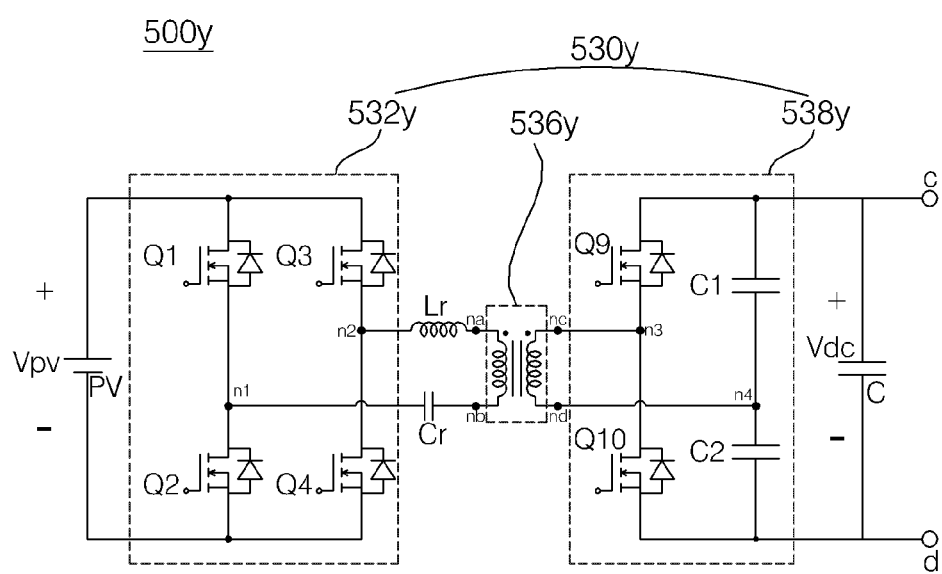

FIGS. 3A and 3B are circuit diagrams of power conversion devices included in a photovoltaic module related to the present invention.

A power conversion device 500x included in the photovoltaic module shown in FIG. 3A includes a full-bridge switching unit 532x, a transformer 536x and a synchronous rectification unit 538x.

In the synchronous rectification unit 538x included in the power conversion device 500x of the photovoltaic module, a diode D1 and a switching element Q5 are connected in series, a diode D2 and a switching element Q6 are connected in series, and the two pairs of the diodes and switching elements are connected in parallel.

According to the power conversion device 500x included in the photovoltaic module of FIG. 3A, the turn ratio of the transformer 536x needs to be considerably high, approximately 1:12, when high voltage step-up is required according to variation in an input voltage Vpv. That is, the transformer 536x having a high turn ratio needs to be used. Furthermore, an additional leakage inductor is required. Accordingly, the size of the transformer 536x increases, thus increasing the volume of the power conversion device 500x.

A power conversion device 500y in the photovoltaic module shown in FIG. 3B includes a full-bridge switching unit 532y, a transformer 536y, a synchronous rectification unit 538y, a resonant capacitor Cr and a resonant inductor Lr between the full-bridge switching unit 532y and the transformer 536y.

According to the power conversion device 500y included in the photovoltaic module of FIG. 3B, the transformer 536y needs to have a high turn ratio although the resonant capacitor Cr and the resonant inductor Lr are provided at the primary side of the transformer 536y. Accordingly, the size of the transformer 536y increases, thus increasing the volume of the power conversion device 500y.

The present invention proposes a method for reducing the size of the transformer while performing power conversion with high voltage step-up and high efficiency. Particularly, the present invention proposes a method for reducing the sizes of circuit elements in the converter by increasing a switching frequency of the full-bridge switching unit 532 and the synchronous rectification unit 538 which is a half-bridge switching unit. This will be described with reference to FIG. 4 and the following figures.

Figure 4:
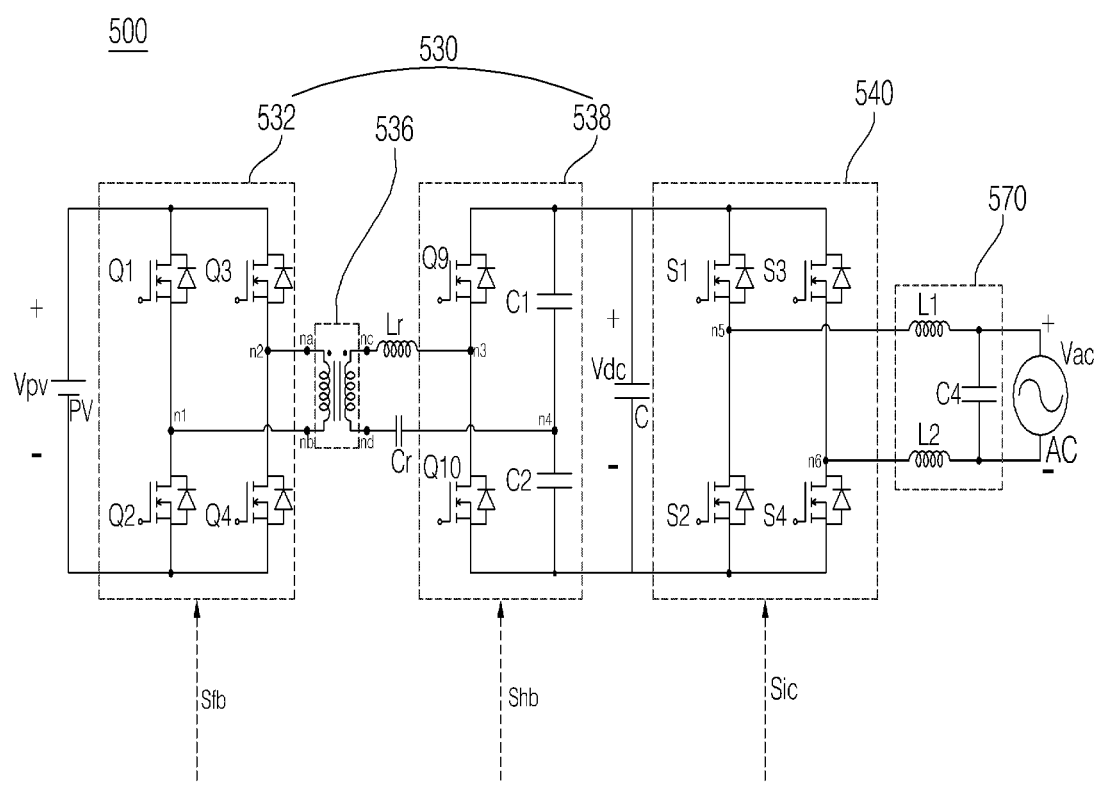
FIG. 4 is a circuit diagram of a power conversion device in the photovoltaic module according to an embodiment of the present invention.
Figure 5:
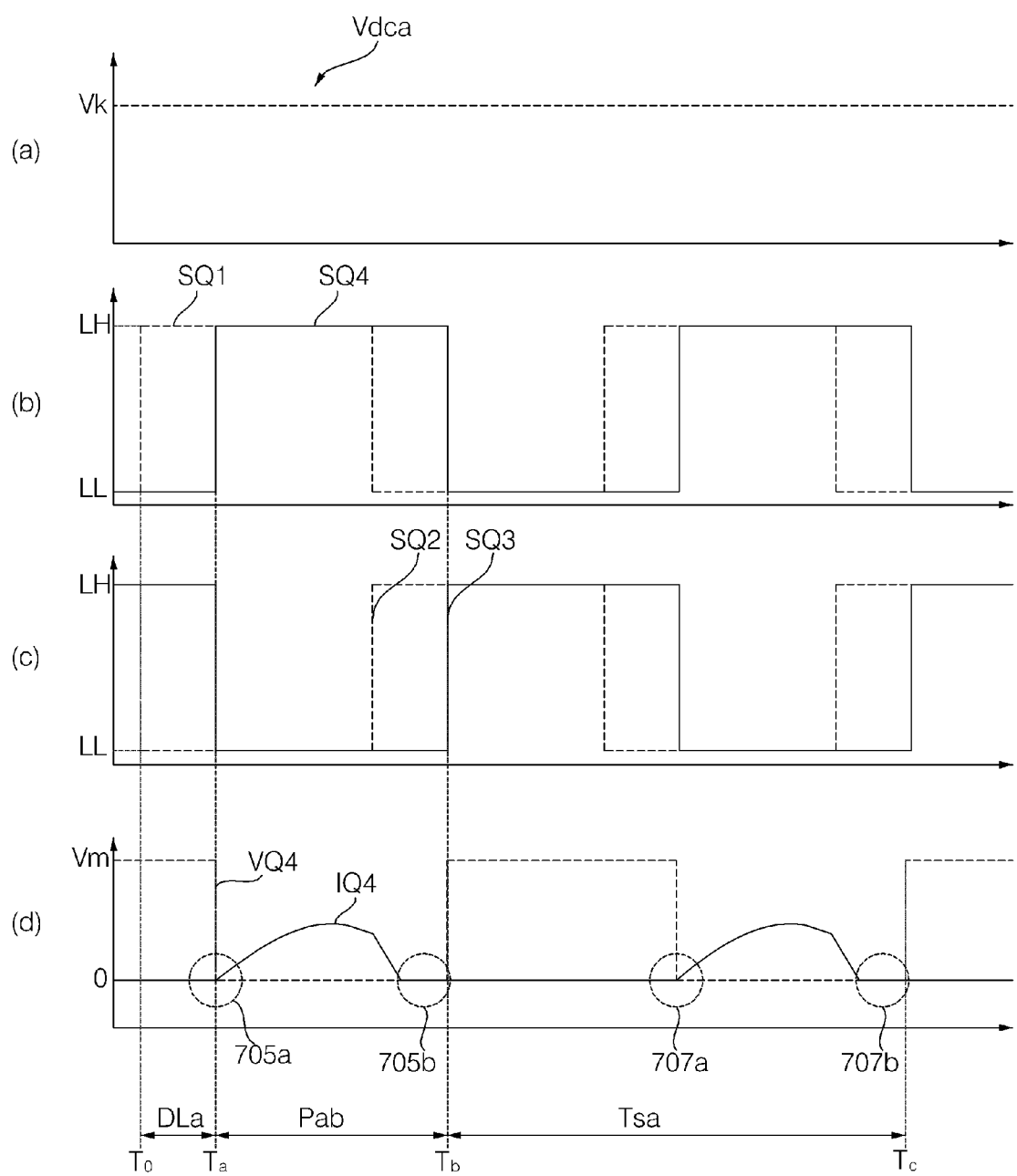
FIGS. 5 to 7 are diagrams referred to illustrating the power conversion device of FIG. 4 according to an embodiment of the present invention.
Figure 6:
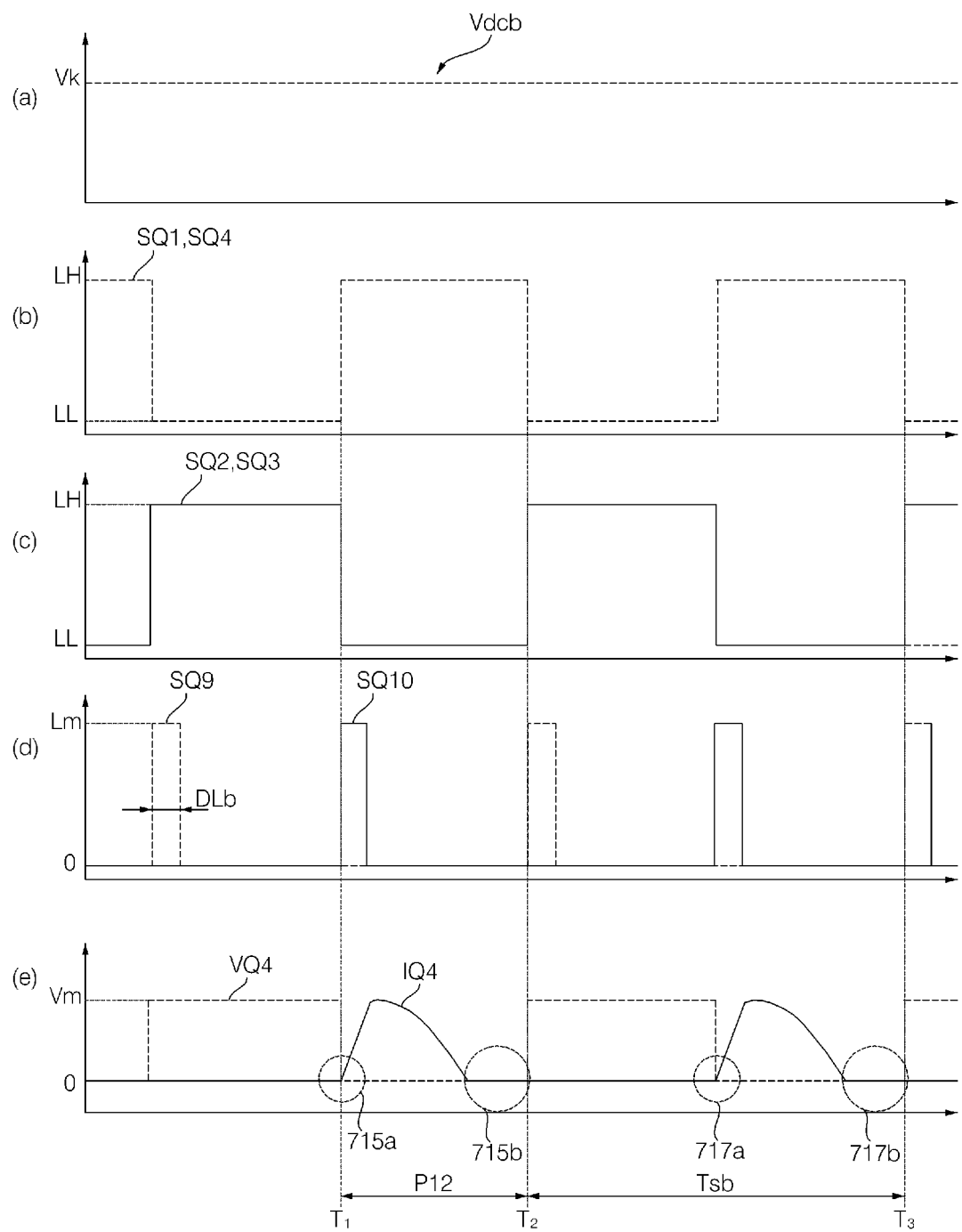
Figure 7:
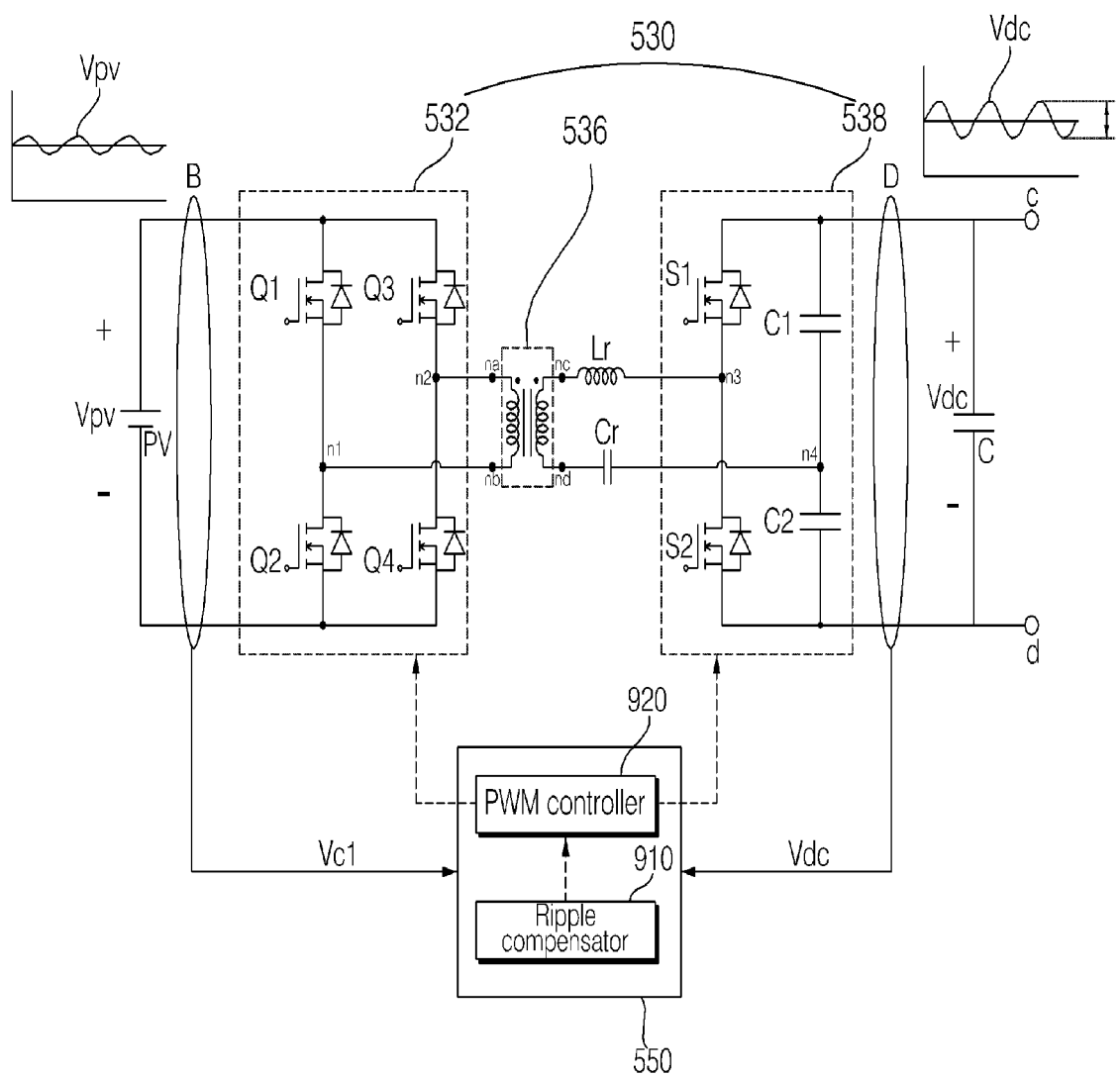

FIG. 4 is a circuit diagram of the power conversion device in the photovoltaic module according to an embodiment of the present invention and FIGS. 5 to 7 are diagrams referred to illustrating the power conversion device of FIG. 4.

Referring to the figures, the power conversion device 500 in the photovoltaic module 100 according to an embodiment of the present invention can include the bypass diode unit 510, the capacitor unit 520, the controller 550, the communication unit 580, the input current detector A, the input voltage detector B, the converter output current detector C, the converter output voltage detector D, the inverter output current detector E and the inverter output voltage detector F, which are shown in FIG. 2, in addition to the converter 530 and the inverter 540.

In addition, to reduce electromagnetic noise, the filter 570 for filtering AC power output from the inverter 540 can be provided at the output terminals of the inverter 540.

The filter 570 can include first and second inductor L1 and L2 connected to both output terminals of the inverter 530, respectively, and a capacitor C4 connected between the first inductor L1 and the second inductor L2.

Accordingly, the filter 570 is realized in an asymmetrical form in consideration of the inverter 540 operating according to asynchronous PWM control, and thus a common mode voltage at the output terminals of the inverter 540 can be reduced and a harmonic component THD of output current can be reduced.

The following description focuses on the converter 530 shown in FIG. 4.

The power conversion device 500 in the photovoltaic module 50 according to an embodiment of the present invention can include the converter 530 which converts the level of DC power input from the solar cell module 100, and the DC-terminal capacitor C which stores DC power output from the converter 530.

The power conversion device 500 in the photovoltaic module 100 according to an embodiment of the present invention can further include the inverter 540, which converts the DC power from the DC-terminal capacitor C into AC power.

The converter 530 according to an embodiment of the present invention can include the full-bridge switching unit 532 which switches DC power, the transformer 536 having the input side connected to the output terminal of the full-bridge switching unit 532, the synchronous rectification unit 538 connected to the output side of the transformer 536, the resonant capacitor Cr and the resonant inductor Lr which are connected between the transformer 536 and the synchronous rectification unit 538.

Particularly, ripples in input current can be reduced according to resonance of the resonant capacitor Cr, the resonant inductor Lr and the transformer 536.

Switching elements Q1 to Q4 in the full-bridge switching unit 532 can perform zero-voltage switching ZVS and zero-current switching ZCS according to the resonant capacitor Cr and the resonant inductor Lr.

As shown, the full-bridge switching unit 532 can include the first and second switching elements Q1 and Q2 connected in series, and the third and fourth switching elements Q3 and Q4 respectively connected in parallel with the first and second switching elements Q1 and Q2.

In addition, the input terminals na and nb of the transformer 536 can be connected between a first node n1 between the first and second switching elements Q1 and Q2 and a second node n2 between the third and fourth switching elements Q3 and Q4.

The inverter 540 can include fifth and sixth switching elements S1 and S2 connected in series, and seventh and eighth switching elements S3 and S4 connected in series.

AC power can be output through a fifth node n5 between the fifth and sixth switching elements S1 and S2 and a sixth node n6 between seventh and eighth switching elements S3 and S4.

As shown, the synchronous rectification unit 538 can include ninth and tenth switching elements Q9 and Q10 connected in series, and first and second capacitors C1 and C2 connected in series.

Here, the ninth and tenth switching elements Q9 and Q10 can be connected in parallel with the first and second capacitors C1 and C2.

The output side of the transformer 536 can be connected between a third node n3 between the ninth and tenth switching elements Q9 and Q10 and a fourth node n4 between the first and second capacitors C1 and C2.

In addition, the synchronous rectification unit 538 is configured in a half bridge form and thus can be referred to as a half-bridge switching unit.

The synchronous rectification unit 538 amplifies an input voltage twice and outputs the amplified voltage and thus can be referred to as a voltage doubler.

The controller 550 can control the converter 530 and the inverter 540 together. Particularly, the controller 550 can output a control signal Sfb to the full-bridge switching unit 532 included in the converter 530 for maximum power point tracking control.

The controller 550 can output a control signal Shb to the synchronous rectification unit 538 in order to control the same. Further, the controller 550 can output a control signal Sic to the inverter 540 in order to control the same.

The controller 550 can vary the switching frequency of the full-bridge switching unit 532 based on the input voltage of the converter 530 or the voltage of the DC-terminal capacitor C. Specifically, the controller 550 can control the full-bridge switching unit 532 to operate in the buck mode or boost mode depending on the voltage level of the DC-terminal capacitor C.

The controller 550 may control the full-bridge switching unit 532 to operate in the buck mode when the voltage of the DC-terminal capacitor C is greater than or equal to a target voltage, and the controller 550 can control the synchronous rectification unit 538 of half-bridge switching unit to operate in the boost mode when the voltage of the DC-terminal capacitor C is lower than the target voltage.

The controller 550 can control the full-bridge switching unit 532 to enter the buck mode and operate at a first switching frequency (1/Tsa=Fsa in FIG. 5) when the voltage of the DC-terminal capacitor C is greater than or equal to the target voltage, and can control the synchronous rectification unit 538 of half-bridge switching unit to operate in the boost mode, and can control the full-bridge switching unit 532 and the synchronous rectification unit 538 to operate at a second switching frequency (1/Tsb=Fsb in FIG. 6) lower than the first switching frequency (1/Tsa=Fsa in FIG. 5) when the voltage of the DC-terminal capacitor C is lower than the target voltage.

It is desirable that the switching frequency of the full-bridge switching unit 532 be higher than a system frequency.

For example, the first switching frequency can be approximately 135 kHz and the second switching frequency can be approximately 90 kHz. Accordingly, high-speed switching is performed and thus, the sizes of the circuit elements in the converters 530 can be reduced. Particularly, the size of the transformer 536 can be reduced.

The controller 550 can control ripples in the voltage of the DC-terminal capacitor C to be reduced through the buck mode or boost mode.

Further, the controller 550 can control some of the switching elements S1 to S4 in the inverter 540 to perform switching at the third switching frequency, and control other switching elements to perform switching at the fourth switching frequency higher than the third switching frequency.

That is, the controller 550 can perform asynchronous PWM control for the inverter 540.

Here, the third switching frequency corresponds to the system frequency and the fourth switching frequency is higher than the third switching frequency, and thus the inverter 540 can perform high-speed switching. Accordingly, the sizes of circuit elements in the power conversion device can be reduced, thus decreasing the size of the power conversion device.

The controller 550 can control the fifth and sixth switching elements S1 and S2 to operate at the fourth switching frequency and control the seventh and eighth switching elements S3 and S4 to operate at the third switching frequency.

Further, the controller 550 can control the fifth and sixth switching elements S1 and S2 to perform switching according to PWM control while the seventh switching element S3 is turned on, and control the sixth and fifth switching elements S2 and S1 to perform switching according to PWM control while the eighth switching element S4 is turned on.

In addition, it is desirable that some S3 and S4 of the switching elements S1 to S4 included in the inverter 540 and others S1 and S2 of the switching elements S1 to S4 be switching elements of different types.

The switching elements S1 and S2 among the switching elements S1 to S4 in the inverter 540, for example, switching elements performing high-speed switching, can include GaN transistors or SiC transistors. Accordingly, reverse recovery loss during high-speed switching can be reduced.

The switching elements S3 and S4 among the switching elements S1 to S4 in the inverter 540, for example, switching elements performing low-speed switching, can include metal-oxide-semiconductor field-effect-transistors (MOSFETs).

FIG. 5 is a diagram referred to illustrating a situation in which the full bridge switching unit 532 operates in the buck mode.

FIG. 5(a) shows a waveform Vdca of the DC-terminal voltage which is the voltage of the DC-terminal capacitor C.

FIG. 5(b) shows switching control signals SQ1 and SQ4 applied to the gates of the first switching element Q1 and the fourth switching element Q4.

FIG. 5(c) shows switching control signals SQ2 and SQ3 applied to the gates of the second switching element Q2 and the third switching element Q3.

FIG. 5(d) shows a voltage waveform VQ4 and a current waveform IQ4 applied to the fourth switching element Q4.

In the buck mode, the first and fourth switching elements Q1 and Q4 are not alternately turned on and the second and third switching elements Q2 and Q3 are not alternately turned on in the full-bridge switching unit 532 and turn-on periods thereof can partially overlap according to phase shift as shown.

That is, a phase difference between the first switching element Q1 and the fourth switching element Q4 is not fixed to 180 degrees and phases or turn-on timing can be varied according to phase shift.

The figure shows that the phase difference between the first switching element Q1 and the fourth element Q4 is DLa.

The controller 550 may control the full-bridge switching unit 532 to operate at a maximum switching frequency and vary the phase difference DLa between switching elements in the full-bridge switching unit 532 in the buck mode.

When the voltage of the DC-terminal capacitor C is greater than or equal to a target voltage, the controller 550 can control the phase difference DLa between switching elements in the full-bridge switching unit 532 to increase as the difference between the voltage of the DC-terminal capacitor C and the target voltage increases.

Particularly, the controller 550 can control the phase difference DLa between the first switching element Q1 and the fourth switching element Q4 to increase as the difference between the voltage of the DC-terminal capacitor C and the target voltage increases.

The controller 550 can control turn-on timing of the fourth and third switching elements Q4 and Q3 in the full-bridge switching unit 532 to be delayed from turn-on timing of the first and second switching elements Q1 and Q2 in the buck mode. Accordingly, the DC-terminal voltage Vda can be varied.

For example, when the first and fourth switching elements Q1 and Q4 are turned on, current flows and thus the resonant capacitor Cr and the resonant inductor Lr resonate.

Thereafter, when the fourth switching element A4 is turned off and the third switching element Q3 is turned on, the current flowing through the transformer 536 decreases to the ground GND or zero, the converter 530 operates in a discontinue mode (DCM) and a secondary switch may perform zero-current switching (ZCS).

The switching elements Q9 and Q10 in the synchronous rectification unit 538 can be switched in synchronization with the first and second switching elements Q1 and Q2 in the full-bridge switching unit 532.

The controller 550 can control turn-on timing delay to increase as the difference between the voltage of the DC-terminal capacitor C and the target voltage increases when the voltage of the DC-terminal capacitor C is greater than or equal to the target voltage.

Accordingly, the difference between the voltage of the DC-terminal capacitor C and the target voltage can be reduced, and thus the DC-terminal voltage waveform Vdca having little ripples, as shown in FIG. 5(a), can be output.

At time Ta and time Tb, zero-voltage turn-on switching 705a and 705b and zero-voltage turn-off switching 705a and 705b of the switching elements in the full-bridge switching unit 532 are performed. Accordingly, power conversion with high voltage step-up and high efficiency can be performed.

FIG. 6 is a diagram referred to illustrating a situation in which the full-bridge switching unit 532 and the synchronous rectification unit 538 operates in the boost mode.

FIG. 6(a) shows a waveform Vdcb of the DC-terminal voltage which is the voltage of the DC-terminal capacitor C.

FIG. 6(b) shows the switching control signals SQ1 and SQ4 applied to the gates of the first switching element Q1 and the fourth switching element Q4.

FIG. 6(c) shows the switching control signals SQ2 and SQ3 applied to the gates of the second switching element Q2 and the third switching element Q3.

FIG. 6(d) shows switching control signals SQ9 and SQ10 applied to the gates of the ninth switching element Q9 and the tenth switching element Q10 in the synchronous rectification unit 538.

FIG. 6(e) shows the voltage waveform VQ4 and the current waveform IQ4 applied to the fourth switching element Q4.

In the boost mode, the controller 550 can control the first and fourth switching elements Q1 and Q4 and the second and third switching elements Q2 and Q3 in the full-bridge switching unit 532 to be alternately turned on, as shown in FIGS. 6(b) and 6(c).

The controller 550 may control the full-bridge switching unit 532 to operate at a minimum switching frequency and vary turn-on duty (e.g., the duty cycle) of the switching elements in the synchronous rectification unit 538 in the boost mode. FIG. 6(d) shows that the turn-on duty is DLb.

For example, the ninth and tenth switching elements Q9 and Q10 in the synchronous rectification unit 538 are turned on with the duty thereof varying while the first and fourth switching elements Q1 and Q4 and the second and third switching elements Q2 and Q3 are alternately turned on.

When the ninth and tenth switching elements Q9 and Q10 in the synchronous rectification unit 538 are turned on, energy is charged in the resonant inductor Lr. Accordingly, boosting is performed.

The controller 550 can control the turn-on duty DLb of the ninth and tenth switching elements Q9 and Q10 in the synchronous rectification unit 538 to increase as the difference between the voltage of the DC-terminal capacitor C and the target voltage increases when the voltage of the DC-terminal capacitor C is lower than the target voltage.

Further, the controller 550 can control turn-on duty of switching elements in the synchronous rectification unit 538 to increase as the difference between the voltage of the DC-terminal capacitor C and the target voltage increases when the voltage of the DC-terminal capacitor C is lower than the target voltage.

Accordingly, the difference between the voltage of the DC-terminal capacitor C and the target voltage can be reduced, and thus the DC-terminal voltage waveform Vdca with little ripples, as shown in FIG. 6(a), can be output.

At time T1 and time T2, zero-voltage turn-on switching 715a and 715b and zero-voltage turn-off switching 715a and 715b of the switching elements in the full-bridge switching unit 532 are performed. Accordingly, power conversion with high voltage step-up and high efficiency can be performed.

FIG. 7 is a block diagram of the controller 550 of the power conversion device 500 according to an embodiment of the present invention.

Referring to the figure, the controller 550 can receive the input voltage Vc1 from the input voltage detector B and the DC-terminal voltage Vdc from the DC-terminal voltage detector D and control the full-bridge switching unit 532 to operate in the buck mode or the boost mode.

Particularly, the controller 550 can control the full-bridge switching unit 532 to operate in the buck mode or control the synchronous rectification unit 538 to operate in the boost mode depending on the voltage level of the DC-terminal capacitor C.

Specifically, the controller 550 can control the full-bridge switching unit 532 to operate in the buck mode and control the full-bridge switching unit 532 and the synchronous rectification unit 538 to operate at the first switching frequency when the voltage of the DC-terminal capacitor C is greater than or equal to a target voltage, and can control the synchronous rectification unit 538 to operate in the boost mode and control the full-bridge switching unit 532 and the synchronous rectification unit 538 to operate at the second switching frequency lower than the first switching frequency when the voltage of the DC-terminal capacitor C is lower than the target voltage.

The controller 550 can include a ripple compensator 910 for compensating for ripples of the DC-terminal capacitor C based on the detected DC-terminal voltage and the target voltage, and a pulse width modulation (PWM) controller 920 for controlling a pulse width with respect to the switching elements in the full-bridge switching unit 532.

For example, the ripple compensator 910 can determine that ripples increase as the difference between the detected DC-terminal voltage and the target voltage increases and compensate for ripples such that the ripples decrease.

The PWM controller 920 can set a phase shift value of the full-bridge switching unit 532 in the buck mode or turn-on duty (e.g., duty cycle) of the switching elements in the synchronous rectification unit 538 in the boost mode based on the compensated ripples.

Accordingly, the controller 550 can output the control signal Sfb to the full-bridge switching unit 532 in the converter 530 and output the control signal Shb to the synchronous rectification unit 538 to control the synchronous rectification unit 538.

Further, the controller 550 can control the full-bridge rectification unit 532 to operate in the buck mode or boost mode depending on the level of the input voltage Vc1 or Vpv.

Specifically, the controller 550 can control the full-bridge switching unit 532 to operate in the buck mode and control the full-bridge switching unit 532 and the synchronous rectification unit 538 to operate at the first switching frequency when the input voltage Vc1 or Vpv is greater than or equal to a reference voltage, and can control the synchronous rectification unit 538 to operate in the boost mode and control the full-bridge switching unit 532 and the synchronous rectification unit 538 to operate at the second switching frequency lower than the first switching frequency when the input voltage Vc1 or Vpv is lower than the reference voltage.

Figure 8:
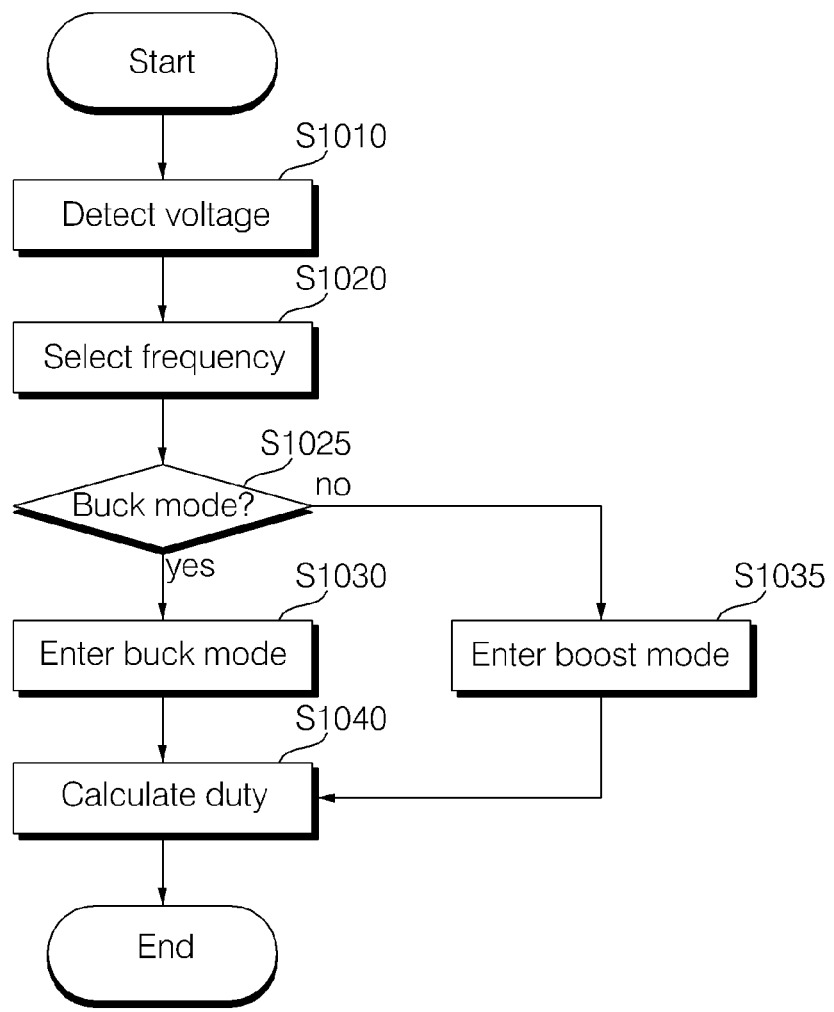
FIG. 8 is a flowchart illustrating a method of operating the photovoltaic module according to an embodiment of the present invention.

FIG. 8 is a flowchart illustrating a method of operating the photovoltaic module according to an embodiment of the present invention.

Referring to the figure, the input voltage detector B and the DC-terminal voltage detector D in the converter 530 respectively detect the input voltage Vc1 and the DC-terminal voltage Vdc (S1010).

Then, the controller 550 receives the input voltage Vc1 from the input voltage detector B and the DC-terminal voltage Vdc from the DC-terminal voltage detector D, selects a switching frequency (S1020), and determines whether to control the full-bridge switching unit 532 to operate in the buck mode (S1025).

For example, the controller 550 can control the full-bridge switching unit 532 to operate in the buck mode when the voltage of the DC-terminal capacitor C is greater than or equal to a target voltage (S1030). Here, the switching frequency of the full-bridge switching unit 532 and the synchronous rectification unit 538, which is a half-bridge switching unit, can be the first switching frequency (e.g., approximately 135 kHz).

When the voltage of the DC-terminal capacitor C is lower than the target voltage, the controller 550 can control the synchronous rectification unit 538 to operate in the boost mode (S1035). Here, the switching frequency of the full-bridge switching unit 532 and the synchronous rectification unit 538, which is a half-bridge switching unit, can be the second switching frequency (e.g., approximately 90 kHz) lower than the first switching frequency (e.g., approximately 135 kHz).

Description of operations in the buck mode and boost mode are omitted, since the operations have been described with reference to FIGS. 4 to 7.

Subsequently, the controller 550 calculates a phase shift of the full-bridge switching unit 532 or turn-on duty of the synchronous rectification unit 538 according to the buck mode or the boost mode (S1040).

Then, the controller 550 can output the control signal Sfb to the full-bridge switching unit 532 in the converter 530 and output the control signal Shb to the synchronous rectification unit 538 in order to control the synchronous rectification unit 538 based on the calculated phase shift or the calculated duty (e.g., duty cycle).

Accordingly, ripples in the DC-terminal voltage decrease, and thus a film capacitor instead of an electrolytic capacitor having large capacity can be used as the DC-terminal capacitor C. Therefore, the size of the DC-terminal capacitor C can be reduced.

Figure 9:
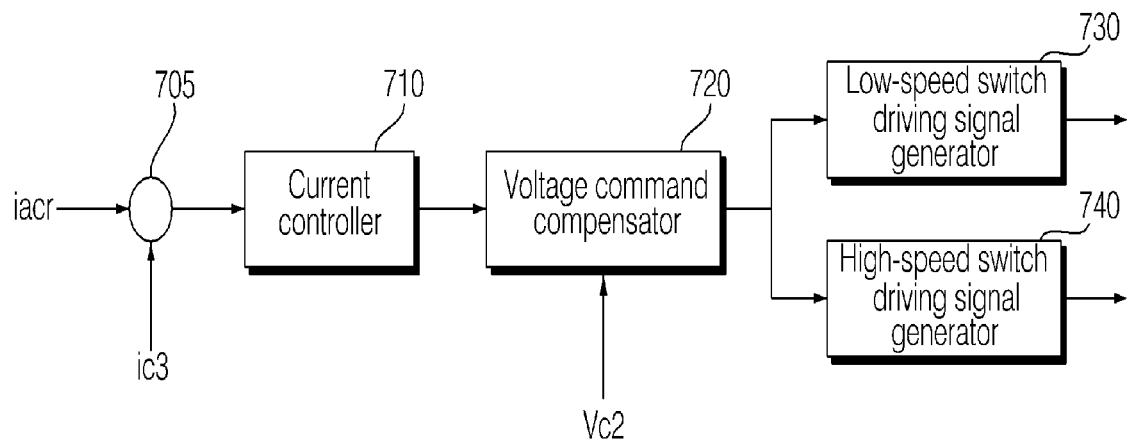
FIGS. 9 to 14B are diagrams referred to illustrating the power conversion device of FIG. 4 according to embodiments of the present invention.

FIG. 9 is a block diagram of the controller 550 in the power conversion device 500 according to an embodiment of the present invention.

Referring to FIG. 9, the controller 550 can include a calculation unit 705 for calculating a difference between an output current command value iacr and an output current ic3 flowing through the inverter 540 for low-speed switching and high-speed switching of the inverter 540, a current controller 710 for outputting a DC-terminal voltage command based on the difference, a voltage command compensator 720 for compensating for a voltage command based on the DC-terminal voltage command and the voltage across the DC-terminal capacitor C, a low-speed switch driving signal generator 730 for outputting a low-speed switching driving signal at the third switching frequency based on an output value from the voltage command compensator 720, and a high-speed switch driving signal generator 740 for outputting a high-speed switching driving signal at the fourth switching frequency based on the output value from the voltage command compensator 720.

That is, a switching control signal for operating the seventh and eighth switching elements S3 and S4 in the inverter 540 can be output through the low-speed switch driving signal generator 730 and a switching control signal for operating the fifth and sixth switching elements S1 and S2 in the inverter 540 can be output through the high-speed switch driving signal generator 740.

Figure 10:
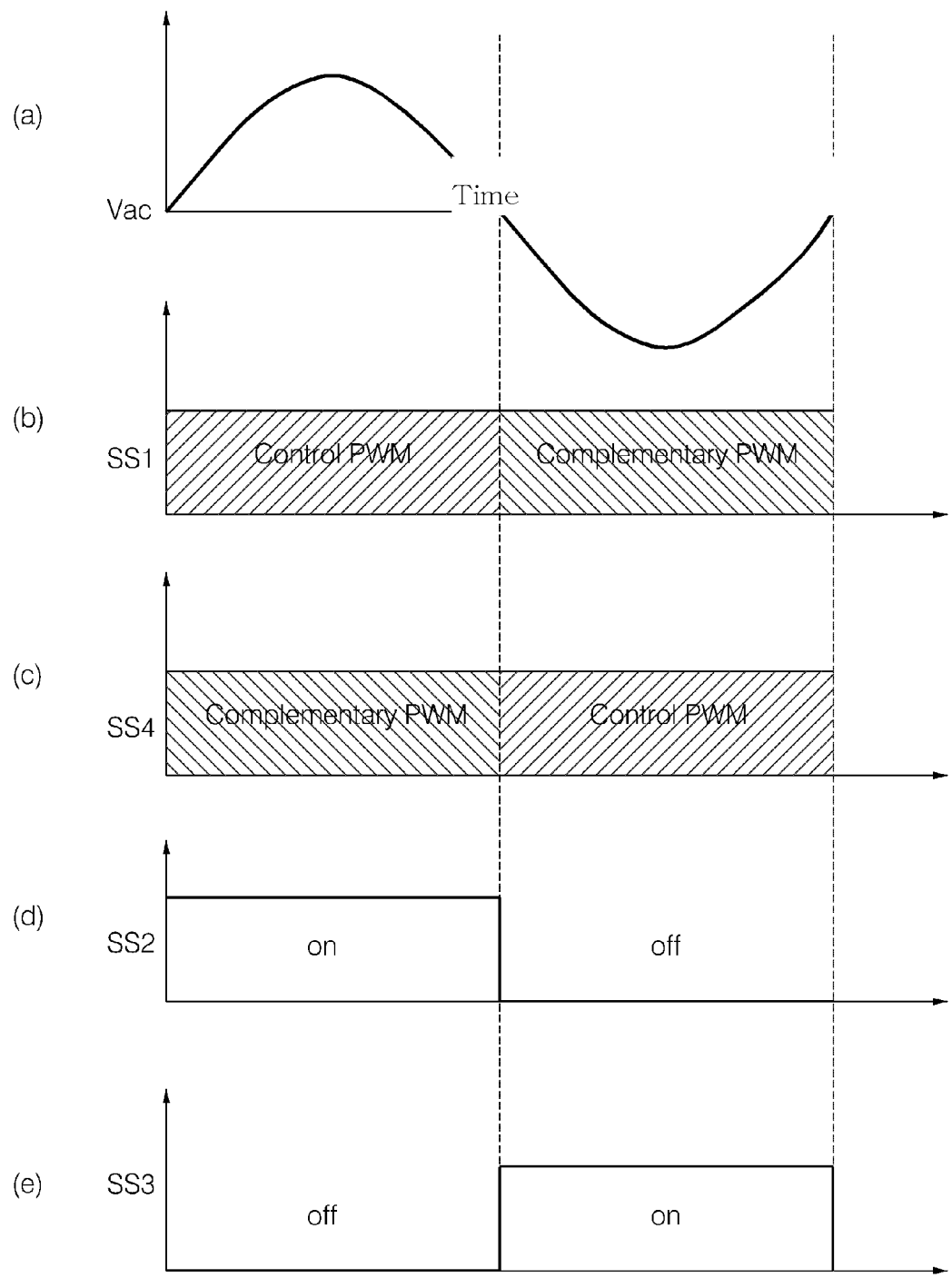

FIG. 10 is a diagram showing driving signals applied to the gates of the fifth to eighth switching elements S1 to S4 during one cycle of an output current Vac output from the inverter 540.

During a positive half cycle of the output current Vac output from the inverter 540, as shown in FIG. 10(*a*), a driving signal SS3 applied to the seventh switching element S3 has a high level and thus the seventh switching element S3 can be continuously turned on as shown in FIG. 10(*d*).

The controller 550 can control the fifth switching element S1 and the sixth switching element S2 to perform switching according to PWM control while the seventh switching element S3 is turned on.

Here, since the fifth switching element S and the sixth switching element S2 complementarily operate, a driving signal applied to the sixth switching element S2 can be a driving signal SS2 for complementary PWM when a driving signal applied to the fifth switching element S1 is a driving signal SS1 for control PWM, as shown.

The seventh switching element S3 and the eighth switching element S4 also complementarily operate, and thus the eighth switching element S4 is turned off while the seventh switching element S3 is turned on.

Figure 11A:
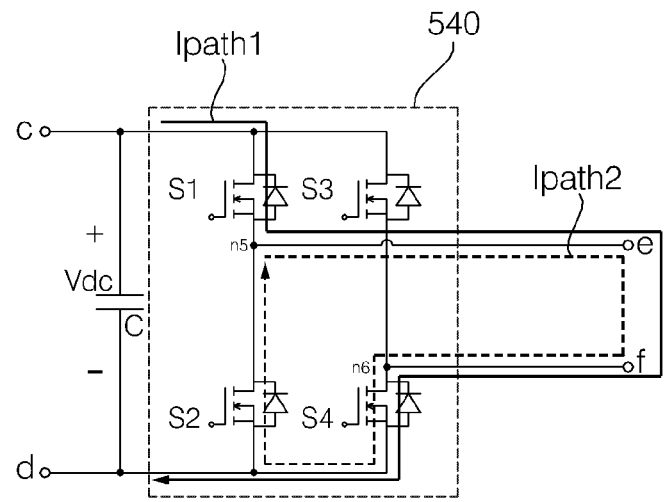

When the fifth switching element S1 is turned on and the sixth switching element S2 is turned off while the fifth and sixth switching elements S1 and S2 perform PWM switching during the positive half cycle of the output current Vac, a current path Ipath1 through the fifth switching element S1 and the eighth switching element S4 can be generated, as shown in FIG. 11A.

When the sixth switching element S2 is turned on and the fifth switching element S1 is turned off while the fifth and sixth switching elements S1 and S2 perform PWM switching during the positive half cycle of the output current Vac, a current path Ipath2 through the eighth switching element S4 and the sixth switching element S2 can be generated, as shown in FIG. 11A.

During a negative half cycle of the output current Vac output from the inverter 540, as shown in FIG. 10(*a*), a driving signal SS4 applied to the eighth switching element S4 has a high level and thus eighth switching element S4 can be continuously turned on as shown in FIG. 10(*e*).

The controller 550 can control the sixth switching element S2 and the fifth switching element S1 to perform switching according to PWM control while eighth switching element S4 is turned on.

Here, since the fifth switching element S and the sixth switching element S2 complementarily operate, the driving signal applied to the fifth switching element S1 can be a driving signal SS1 for complementary PWM when the driving signal applied to the sixth switching element S2 is a driving signal SS2 for control PWM, as shown.

The seventh switching element S3 and the eighth switching element S4 also complementarily operate, and thus the seventh switching element S3 is turned off while the eighth switching element S4 is turned on.

Figure 11B:
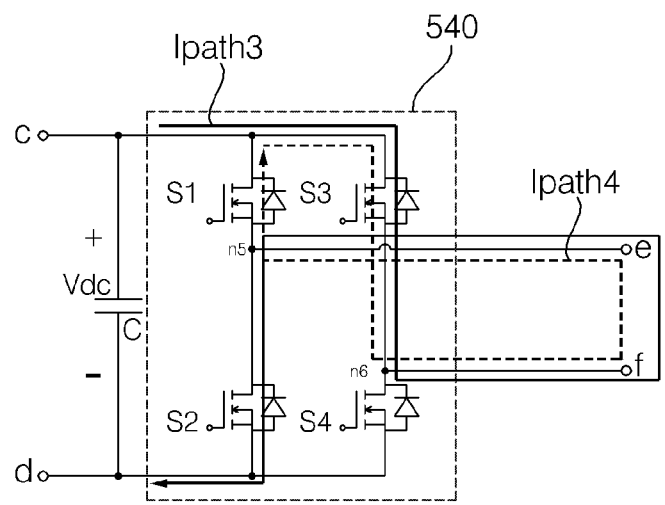

When the sixth switching element S2 is turned on and the fifth switching element S1 is turned off while the fifth and sixth switching elements S1 and S2 perform PWM switching during the negative half cycle of the output current Vac, a current path Ipath3 through the seventh switching element S3 and the sixth switching element S2 can be generated, as shown in FIG. 11B.

When the fifth switching element S1 is turned on and the sixth switching element S2 is turned off while the fifth and sixth switching elements S1 and S2 perform PWM switching during the negative half cycle of the output current Vac, a current path Ipath4 through the seventh switching element S3 and the fifth switching element S1 can be generated, as shown in FIG. 11B.

Figure 12A:
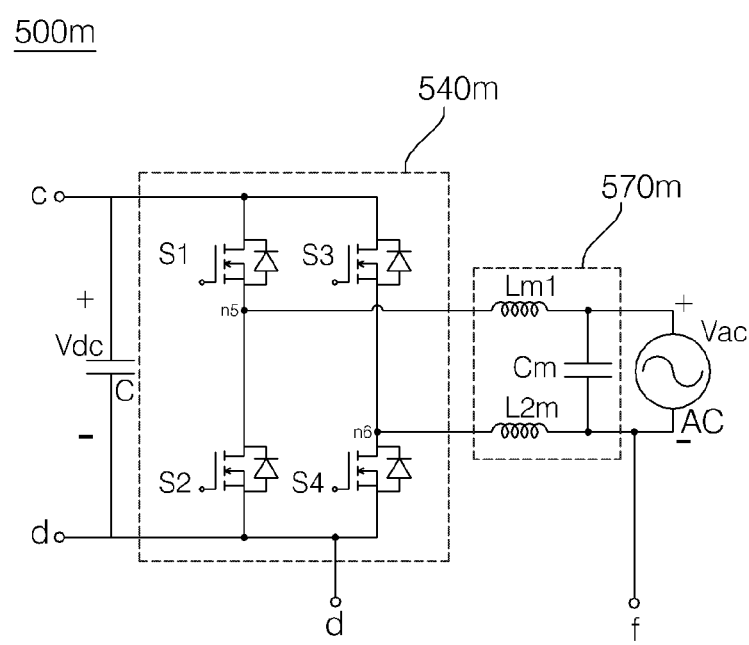

FIG. 12A is a diagram showing an inverter 540*m* and a filter 570*m* of a power conversion device 500*m* compared with the present invention.

The inverter 540*m* shown in FIG. 12A is similar to that of the present application but the filter 570*m* differs from that of the present application in that the filter 570*m* is configured in a symmetrical form.

That is, the filter 570*m* shown in FIG. 12A can include first and second inductors Lm1 and Lm2 respectively provided at both terminals of the inverter 540*m*, and a capacitor Cm connected between the first and second inductors Lm1 and Lm2.

A first leg can include the fifth switching element S1 and the sixth switching element S2 of the plurality of switching elements S1 to S4 of the inverter 540, and a second leg can include the seventh and eighth switching elements S3 and S4 of the plurality of switching elements S1 to S4 of the inverter 540.

Here, a switching frequency of the first leg can be different from a switching frequency of the second leg.

Figure 12B:
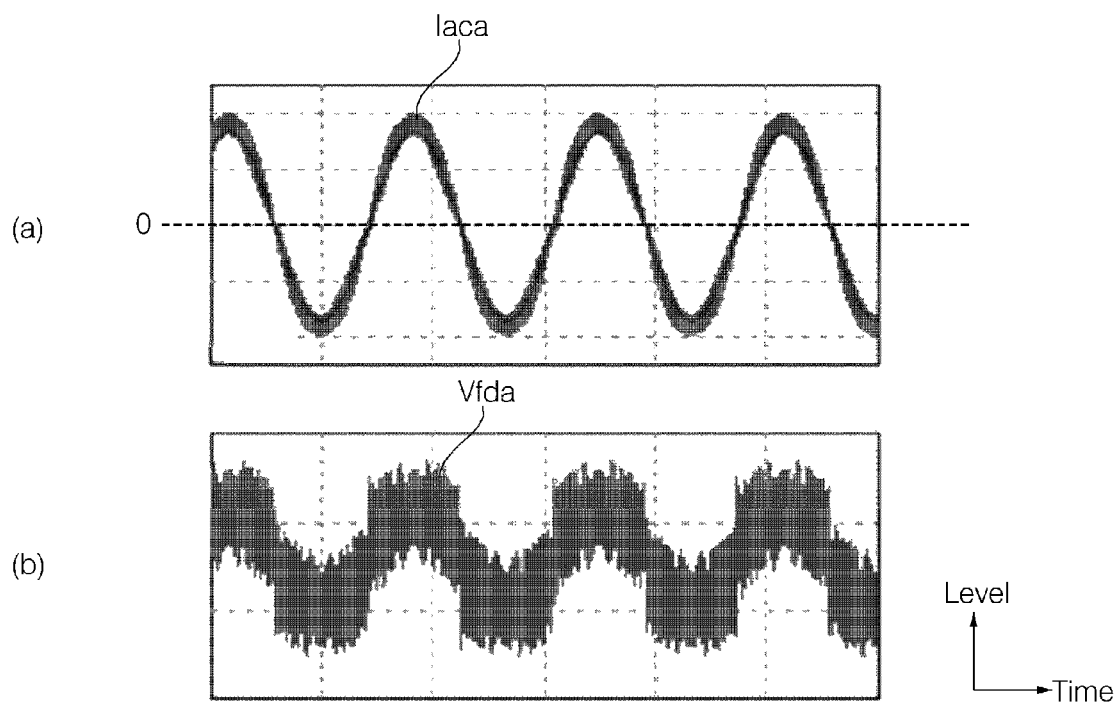

In the inverter 540 according to an embodiment of the present invention, some legs (the seventh and eighth switching elements S3 and S4) perform low-speed switching and other legs (the fifth and sixth switching elements S1 and S2) perform high-speed switching according to asynchronous PWM, as described above. Accordingly, an output current waveform Iaca and a common mode voltage waveform Vfda as shown in FIG. 12B can appear when a symmetrical filter such as the filter 570*m* of FIG. 12A is used.

Particularly, it can be known from the common mode voltage waveform Vfda that a common mode voltage considerably increases.

To solve such a problem, the present invention uses the asymmetrical filter 570 corresponding to the asynchronous inverter 540.

Figure 13A:
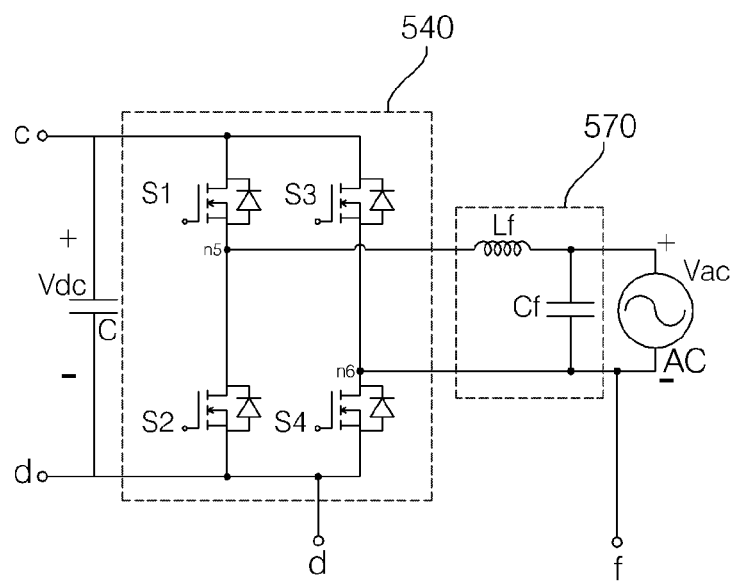

FIG. 13A illustrates the inverter 540 and the filter 570 in the power conversion device 500 according to an embodiment of the present invention.

The filter 570 according to an embodiment of the present invention can include an inductor Lf connected to one of the output terminals of the inverter 540, and a capacitor Cf connected between the inductor Lf and the other output terminal of the inverter 540.

Particularly, since the inductor Lf is connected to only one of the output terminals of the inverter 540, a common mode voltage caused by the inverter 540 which asynchronously operates according to high-speed switching and low-speed switching can be considerably reduced.

Figure 13B:
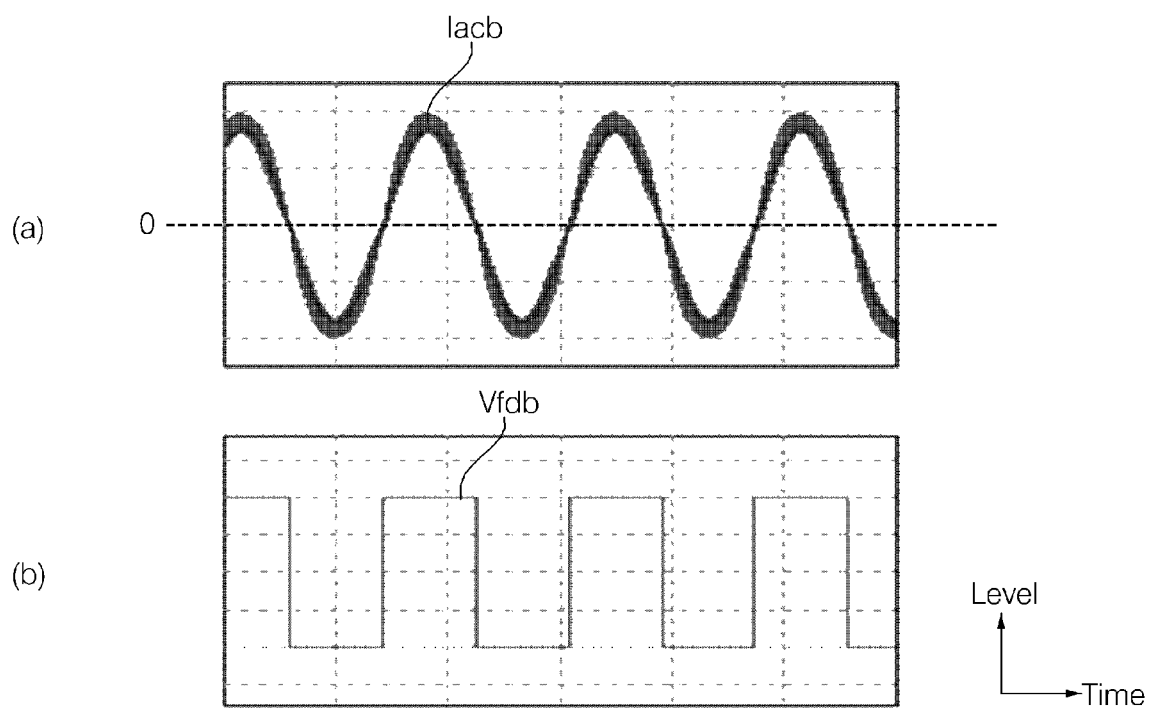

FIG. 13B shows an output current waveform Iacb and a common mode voltage waveform Vfdb according to the inverter 540 and the filter 570 shown in FIG. 13A. It can be known from the figure that the common mode voltage can be considerably reduced according to the inverter 540 and the filter 570 shown in FIG. 13A.

In addition, the controller 550 according to an embodiment of the present invention controls ripples in the voltage of the DC-terminal capacitor to decrease.

Figure 14A:
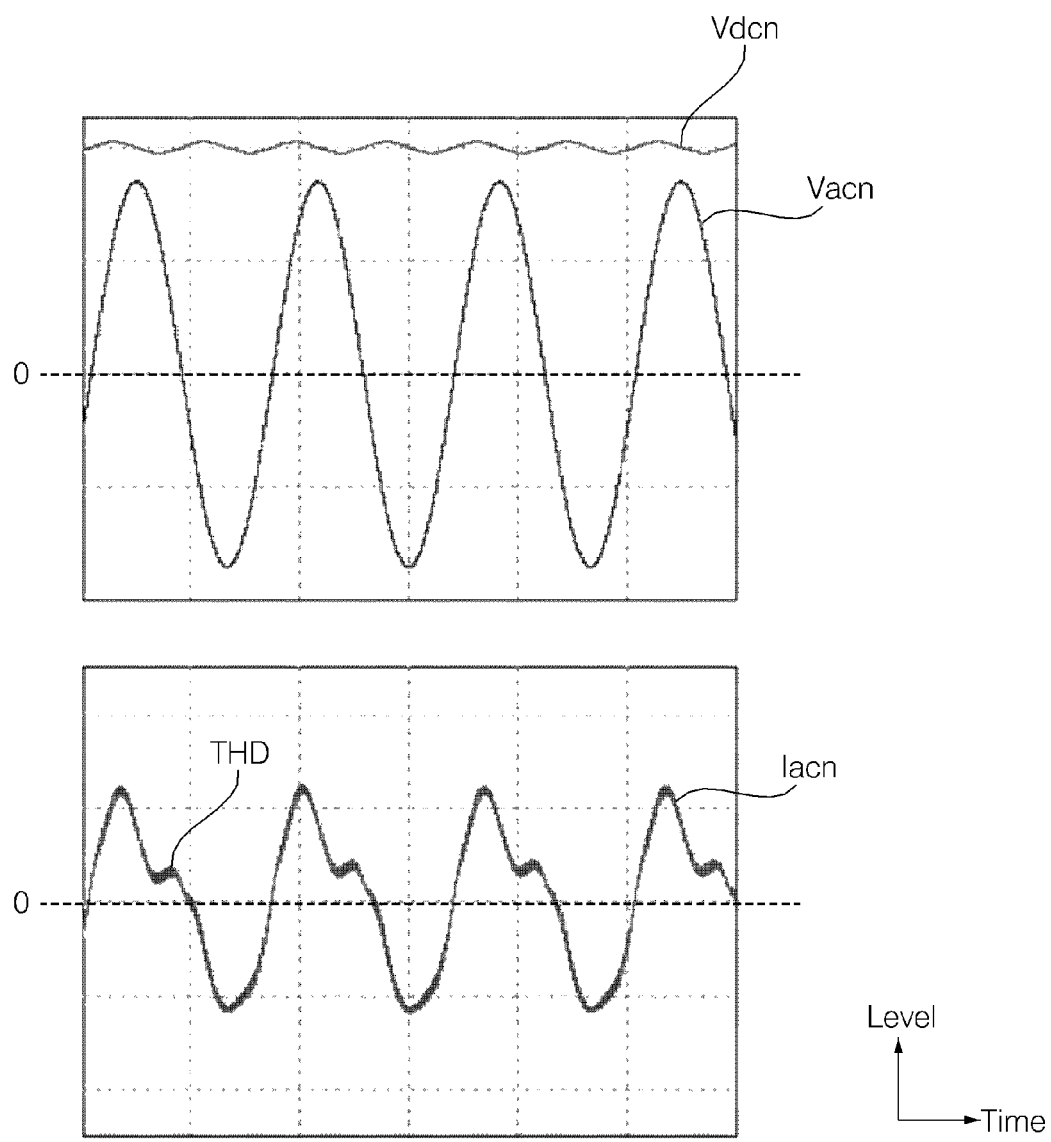

FIG. 14A shows a system output current Iacn when control for decreasing ripples in the voltage of the DC-terminal capacitor is not performed.

Referring to FIG. 14A, it can be known that output current is distorted due to harmonic components THD in the system output current Iacn.

Figure 14B:
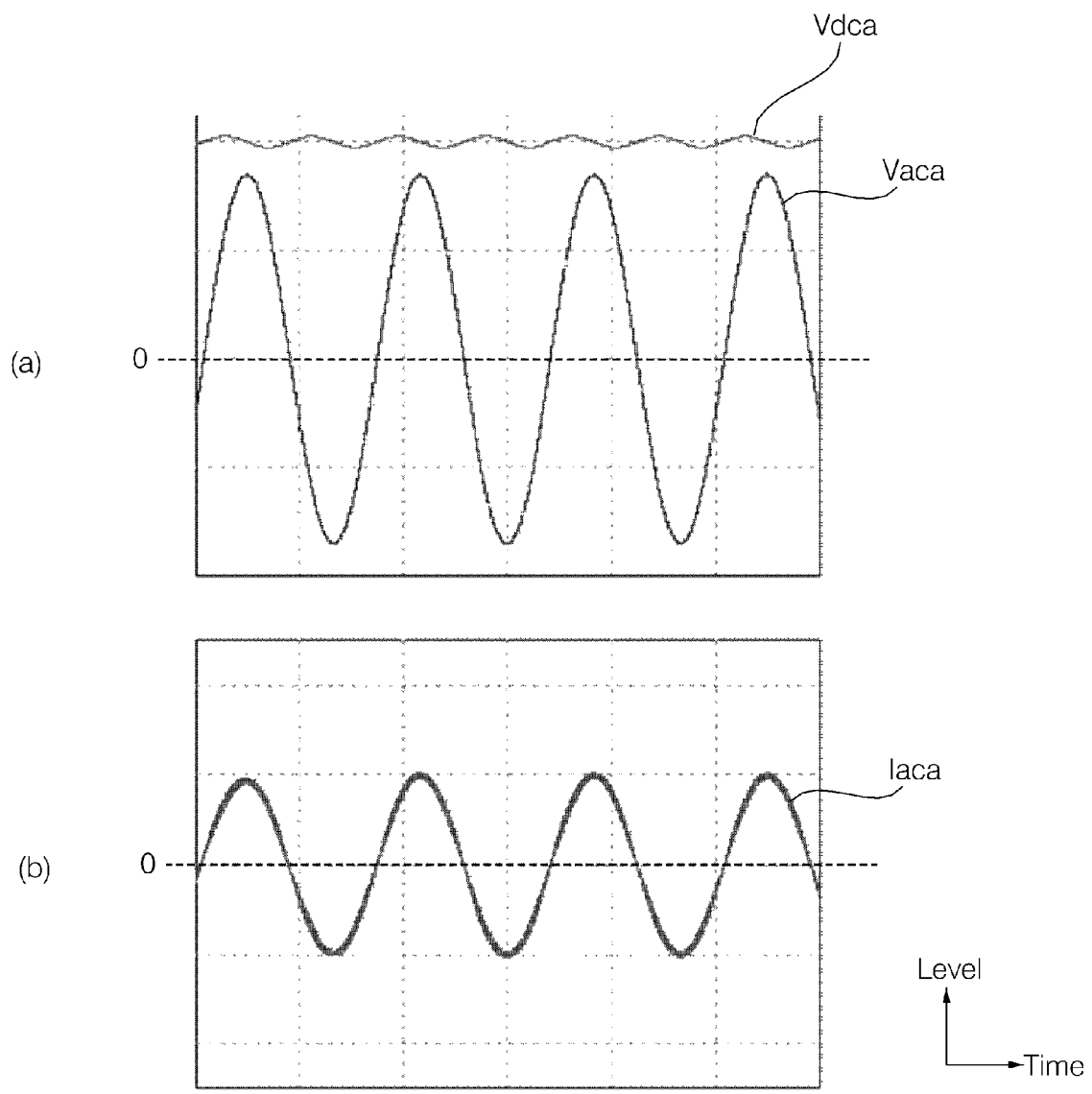

FIG. 14B shows a DC-terminal voltage waveform Vdca, a system output voltage waveform Vaca, and a system output current waveform Iaca when control for decreasing ripples in the voltage of the DC-terminal capacitor is performed.

Referring to FIG. 14B, it can be known that the DC-terminal voltage waveform Vdca has little ripples and the system output voltage waveform Vaca and the system output current waveform Iaca are hardly distorted. That is, it can be known that harmonic components THD in the system output current Iacn are removed.

As described in FIGS. 9 to 14B, the low-speed switching and the high-speed switching of the inverter 540 are operated based on the dc voltage, so that the converter in the power conversion device 500 according to an embodiment of the present invention is not limited to the converter 530 described in FIGS. 4 to 8.

In addition, the converter 530 in the power conversion device 500 according to an embodiment of the present invention can include a full-bridge switching unit 532 which switches DC power, a transformer 536 having an input side connected to an output terminal of the full-bridge switching unit 532, a synchronous rectification unit 538 connected to an output side of the transformer 536, and a resonant capacitor Cr and a resonant inductor Lr which are connected between the transformer 536 and the synchronous rectification unit 538. The controller 550 may perform power conversion with high voltage step-up and high efficiency by varying a switching frequency of the full-bridge switching unit 532 and the synchronous rectification unit 538 which is a half-bridge switching unit based on the input voltage of the converter 530 or the voltage of a DC-terminal capacitor C.

Accordingly, the efficiency of the inverter 540 can be further improved by power conversion apparatus 500 combining the converter 530 described in FIGS. 4 to 8 with the inverter 540 described in FIGS. 9 to 14B.

Figure 15:
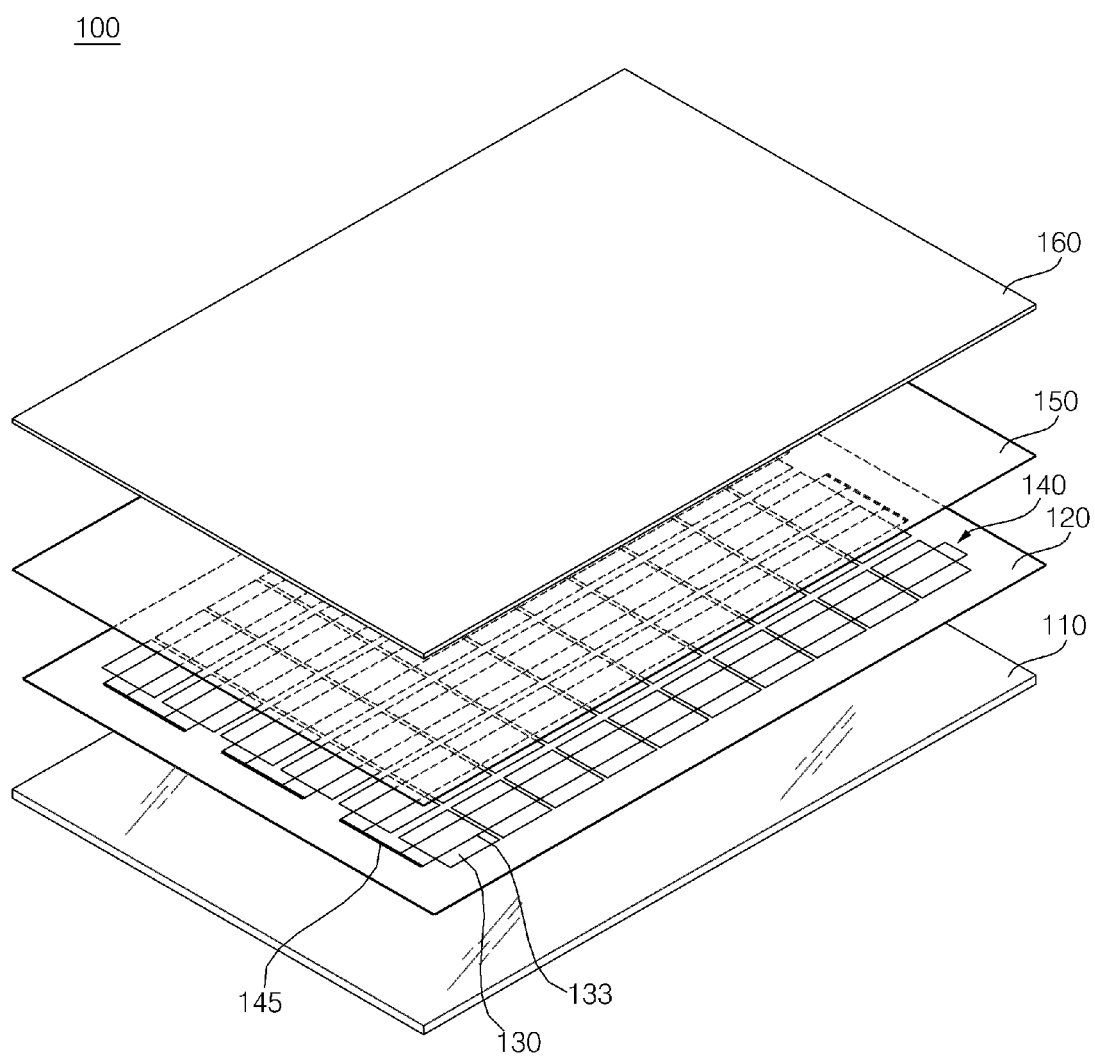
FIG. 15 is an exploded perspective view of a solar cell module of FIG. 1A or FIG. 1B according to an embodiment of the present invention.

FIG. 15 is an exploded perspective view of the solar cell module of FIG. 1A or FIG. 1B.

Referring to FIG. 15, the solar cell module 100 of FIG. 2 can include a plurality of solar cells 130. In addition, the solar cell module 100 may further include a first sealant 120 and a second sealant 150 provided on the upper surface and the lower surface of the solar cells 130, a rear substrate 110 provided under the first sealant 120, and a front substrate 160 provided on the second sealant 150.

The solar cell 130 is a semiconductor device which converts solar energy into electric energy and can be a silicon solar cell, a compound semiconductor solar cell, a tandem solar cell, a dye-sensitized solar cell, a CdTe solar cell, a CIGS solar cell or a thin film solar cell.

The solar cell 130 is formed on a light-receiving surface to which sunlight is input and a rear surface opposite the light-receiving surface. For example, the solar cell 130 can include a first conductivity type silicon substrate, a second conductivity type semiconductor layer which is formed on the silicon substrate and has a conductivity type opposite the first conductivity type, an antireflection film which includes at least one opening for partially exposing the second conductivity type semiconductor layer and is formed on the second conductivity type semiconductor layer, a front electrode contacting a portion of the second conductivity type semiconductor layer exposed through the at least one opening, and a rear electrode formed on the rear side of the silicon substrate.

The solar cells 130 can be electrically connected in series or parallel, or in serial-parallel. Specifically, the plurality of solar cells 130 can be electrically connected through the ribbon 133. The ribbon 133 can be attached to the front electrode formed on the light-receiving surface of a solar cell 130 and a rear electrode formed on the rear side of a neighboring solar cell 130. The figure shows that the ribbon 133 is formed in two lines and the solar cells 130 are connected in a row through the ribbon 133 to form a solar cell string 140.

Thus, six strings 140a, 140b, 140c, 140d, 140e and 140f are formed and each string can include ten solar cells, as described above with reference to FIG. 2.

The rear substrate 110 is a back sheet and serves to execute waterproofing, insulation and sunblocking functions. The rear substrate 110 may be a Tedlar/PET/Tedlar (TPT) type but the present invention is not limited thereto. In addition, although the rear substrate 110 is rectangular in FIG. 15, the rear substrate 110 can be manufactured in various forms such as a circle and a semicircle according to environment in which the solar cell module 100 is installed.

The first sealant 120 can be attached to the rear substrate 110 having the same size as the rear substrate 110, and a plurality of solar cells 130 can be arranged in several rows on the first sealant 120.

The second sealant 150 is positioned on the solar cells 130 and attached to the first sealant 120 through lamination.

Here, the first sealant 120 and the second sealant 150 are used to chemically connect elements of the solar cells. Various materials such as ethylene vinyl acetate (EVA) film can be used as the first sealant 120 and the second sealant 150.

The front substrate 160 is positioned on the second sealant 150 such that sunlight is transmitted through the front substrate 160. It is desirable that the front substrate 160 be tempered glass in order to protect the solar cells 130 from external impact. It is more desirable that the front substrate 160 be low-iron tempered glass in order to prevent reflection of sunlight and to improve transmissivity of sunlight.

As is apparent from the above description, according to an embodiment of the present invention, a photovoltaic module includes a solar cell module including a plurality of solar cells, a converter to convert the level of DC power input from the solar cell module, a DC-terminal capacitor to store DC power output from the converter, an inverter including a plurality of switching elements and configured to convert DC power from the DC-terminal capacitor into AC power, and a controller to control the inverter. The converter can control some of the plurality of switching elements included in the inverter to perform switching at a third switching frequency and control others to perform switching at a fourth switching frequency higher than the first switching frequency, thereby reducing the size of a power conversion device.

Particularly, switching is performed at the third switching frequency corresponding to a system frequency and the fourth switching frequency higher than the third switching frequency to obtain high-speed switching effect. Accordingly, the sizes of circuit elements in the power conversion device including the inverter can be reduced.

The other switching elements among the plurality of switching elements may include GaN transistors or SiC transistors, and thus reverse recovery loss during high-speed switching can be reduced.

A filter provided at output terminals of the inverter includes an inductor connected to one of the output terminals of the inverter and a capacitor connected between the inductor and the other output terminal of the inverter. Accordingly, a common mode voltage at the output terminals of the inverter can be reduced. In addition, harmonic components (THD) of an output current can be reduced.

The controller can perform power conversion with high voltage step-up and high efficiency by varying a switching frequency of a full-bridge switching unit based on the input voltage of the converter or the voltage of the DC-terminal capacitor.

Particularly, the controller can control the full-bridge switching unit to enter a buck mode and operate at a first switching frequency when the voltage of the DC-terminal capacitor is greater than or equal to a target voltage and control the full-bridge switching unit to enter a boost mode and operate at a second switching frequency lower than the first switching frequency when the voltage of the DC-terminal capacitor is lower than the target voltage, thereby performing power conversion with high voltage step-up and high efficiency.

Here, the first and second switching frequencies can be switching frequencies that are much higher than the system frequency, and thus the sizes of circuit elements in the converter can be reduced.

Particularly, the turn ratio of a transformer can be reduced, thus decreasing the size of the transformer. Consequently, the converter used in the photovoltaic module can be reduced in size.

Further, ripples in the voltage of the DC-terminal capacitor are controlled to decrease, and thus a film capacitor instead of an electrolyte capacitor can be used as the DC-terminal capacitor. Accordingly, the size of the DC-terminal capacitor can be reduced.

When the voltage of the DC-terminal capacitor is greater than or equal to the target voltage, the full-bridge switching unit is controlled to enter the buck mode in which a phase difference between switching elements in the full-bridge switching unit increases as the difference between the voltage of the DC-terminal capacitor and the target voltage increases such that the voltage of the DC-terminal capacitor follows the target voltage.

When the voltage of the DC-terminal capacitor is lower than the target voltage, the synchronous rectification unit is controlled to enter the boost mode in which a turn-on duty of switching elements in the synchronous rectification unit increases as the difference between the voltage of the DC-terminal capacitor and the target voltage increases such that the voltage of the DC-terminal capacitor follows the target voltage.

A photovoltaic module according to another embodiment of the present invention includes a solar cell module including a plurality of solar cells, a converter to convert the level of DC power input from the solar cell module, a DC-terminal capacitor to store DC power output from the converter, an inverter including first to fourth switching elements and configured to convert DC power from the DC-terminal capacitor into AC power, and a controller to control the inverter. The converter can perform asynchronous PWM control on the inverter to reduce the size of the power conversion device.

Particularly, switching is performed at the third switching frequency corresponding to the system frequency and the fourth switching frequency higher than the third switching frequency to obtain high-speed switching effect. Accordingly, the sizes of circuit elements in the power conversion device including the inverter can be reduced.

A photovoltaic module according to another embodiment of the present invention includes a solar cell module including a plurality of solar cells, a converter for converting the level of DC power input from the solar cell module, a DC-terminal capacitor for storing DC power output from the converter, and a controller for controlling the converter. The converter includes a full-bridge switching unit for switching the DC power, a transformer having an input side connected to an output terminal of the full-bridge switching unit, a synchronous rectification unit connected to an output side of the transformer, and a resonant capacitor and a resonant inductor connected between the transformer and the synchronous rectification unit, and the controller varies a switching frequency of the full-bridge switching unit based on an input voltage of the converter or a voltage of the DC-terminal capacitor, thereby performing power conversion with high voltage step-up and high efficiency.

Particularly, the controller controls the full-bridge switching unit to enter a buck mode such that the full-bridge switching unit and the synchronous rectification unit operate at a first switching frequency when the voltage of the DC-terminal capacitor is greater than or equal to a target voltage, and controls the synchronous rectification unit to enter a boost mode such that the full-bridge switching unit and the synchronous rectification unit operate at a second switching frequency lower than the first switching frequency when the voltage of the DC-terminal capacitor is lower than the target voltage. Accordingly, power conversion with high voltage step-up and high efficiency can be performed.

Here, the first and second switching frequencies can be switching frequencies that are much higher than a system frequency, and thus the sizes of circuit elements in the converter can be reduced.

Particularly, the turn ratio of the transformer can be reduced and thus the size of the transformer can be decreased. As a result, the size of the converter used for the photovoltaic module can be reduced.

Further, ripples in the voltage of the DC-terminal capacitor are controlled to decrease, and thus a film capacitor instead of an electrolyte capacitor can be used as the DC-terminal capacitor. Accordingly, the size of the DC-terminal capacitor can be reduced.

When the voltage of the DC-terminal capacitor is greater than or equal to the target voltage, the full-bridge switching unit is controlled to enter the buck mode in which a phase difference between switching elements in the full-bridge switching unit increases as the difference between the voltage of the DC-terminal capacitor and the target voltage increases such that the voltage of the DC-terminal capacitor follows the target voltage.

When the voltage of the DC-terminal capacitor is lower than the target voltage, the synchronous rectification unit is controlled to enter the boost mode in which a turn-on duty of switching elements in the synchronous rectification unit increases as the difference between the voltage of the DC-terminal capacitor and the target voltage increases such that the voltage of the DC-terminal capacitor follows the target voltage.

A photovoltaic module according to another embodiment of the present invention includes a solar cell module including a plurality of solar cells, a converter for converting the level of DC power input from the solar cell module, a DC-terminal capacitor for storing DC power output from the converter, and a controller for controlling the converter. The converter includes a full-bridge switching unit for switching the DC power, a transformer having an input side connected to an output terminal of the full-bridge switching unit, a synchronous rectification unit connected to an output side of the transformer, and a resonant capacitor and a resonant inductor connected between the transformer and the synchronous rectification unit, and the controller controls the full-bridge switching unit or the synchronous rectification unit to operate in a buck mode or a boost mode depending on a voltage level of the DC-terminal capacitor, thereby performing power conversion with high voltage step-up and high efficiency.

Particularly, in the photovoltaic module according to another embodiment of the present invention, the full-bridge switching unit is controlled to operate in the buck mode and the full-bridge switching unit and the synchronous rectification unit are controlled to operate at the first switching frequency when the voltage of the DC-terminal capacitor is greater than or equal to a target voltage, and the synchronous rectification unit is controlled to operate in the boost mode and the full-bridge switching unit and the synchronous rectification unit are controlled to operate at the second switching frequency lower than the first switching frequency when the voltage of the DC-terminal capacitor is lower than the target voltage. Accordingly, power conversion with high voltage step-up and high efficiency can be performed.

The photovoltaic module according to an embodiment of the present invention is not limited to the above-described embodiments and all or some of the embodiments can be selectively combined such that the embodiments can be modified in various manners.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photovoltaic module comprising:
   a solar cell module including a plurality of solar cells;
   a converter configured to convert a level of DC power input from the solar cell module;
   a DC-terminal capacitor configured to store DC power output from the converter;
   an inverter including a plurality of switching elements and configured to convert DC power from the DC-terminal capacitor into AC power; and
   a controller configured to control the inverter,
   wherein the converter comprises a full-bridge switching unit configured to switch the DC power,
   wherein the controller is further configured to:
   control the full-bridge switching unit to enter a buck mode and operate at a first switching frequency when a voltage of the DC-terminal capacitor is greater than or equal to a target voltage, and
   control the full-bridge switching unit to enter a boost mode and operate at a second switching frequency lower than the first switching frequency when the voltage of the DC-terminal capacitor is lower than the target voltage,
   wherein the inverter includes first and second inverter switching elements connected in series, and third and fourth inverter switching elements connected in series, and a pair of the first and second inverter switching elements is connected to a pair of the third and fourth inverter switching elements in parallel,
   wherein the controller is further configured to switch the third and fourth inverter switching elements in the inverter at a third switching frequency, and to switch the first and second inverter switching elements in the inverter at a fourth switching frequency higher than the third switching frequency, and
   wherein the third switching frequency corresponds to system frequency or frequency of grid, and the third switching frequency is less than the first switching frequency and the second switching frequency.

2. The photovoltaic module according to claim 1, further comprising:
   a filter configured to filter the AC power output from the inverter.

3. The photovoltaic module according to claim 2, wherein the filter includes an inductor connected to an output terminal of the inverter, and a capacitor connected between the inductor and another output terminal of the inverter.

4. The photovoltaic module according to claim 1, wherein the third and fourth inverter switching elements and the first and second inverter switching elements are switching elements of different types.

5. The photovoltaic module according to claim 1, wherein the third and fourth inverter switching elements include metal-oxide-semiconductor field-effect-transistors (MOSFETs), and the first and second inverter switching elements include GaN transistors or SiC transistors.

6. The photovoltaic module according to claim 1, wherein the controller performs asynchronous PWM control on the inverter.

7. The photovoltaic module according to claim 1, wherein the controller comprises:
   a current controller configured to output a DC-terminal voltage command based on an output current flowing through the inverter;
   a voltage command compensator configured to compensate for a voltage command based on the DC-terminal voltage command and a voltage across both terminals of the DC-terminal capacitor;
   a low-speed switching driving signal generator configured to output a low-speed switching driving signal at the third switching frequency based on an output value from the voltage command compensator; and
   a high-speed switching driving signal generator configured to output a high-speed switching driving signal at the fourth switching frequency based on the output value from the voltage command compensator.

8. The photovoltaic module according to claim 1, wherein the converter further comprises:
   a transformer having an input side connected to an output terminal of the full-bridge switching unit;
   a synchronous rectification unit connected to an output side of the transformer;
   a resonant capacitor connected between the transformer and the synchronous rectification unit; and
   a resonant inductor connected between the transformer and the synchronous rectification unit.

9. The photovoltaic module according to claim 8, wherein the full-bridge switching unit comprises:
   first and second switching elements connected in parallel; and
   third and fourth switching elements respectively connected in series to the first and second switching elements, wherein the input side of the transformer is connected between a first node located between the first and second switching elements and a second node located between the third and fourth switching elements.

10. The photovoltaic module according to claim 8, wherein the controller is further configured to:
   increase a phase difference between switching elements in the full-bridge switching unit as a difference between a voltage of the DC-terminal capacitor and the target voltage increases, when the voltage of the DC-terminal capacitor is greater than or equal to the target voltage.

11. The photovoltaic module according to claim 8, wherein the controller is further configured to:
   increase a turn-on duty of switching elements in the synchronous rectification unit as a difference between a voltage of the DC-terminal capacitor and the target voltage increases, when the voltage of the DC-terminal capacitor is lower than the target voltage.

12. The photovoltaic module according to claim 1, wherein the AC power is output through a node located between the first and second inverter switching elements and a node located between the third and fourth inverter switching elements.

13. The photovoltaic module according to claim 1, wherein the controller is further configured to:
   control the first and second inverter switching elements to perform switching according to PWM control while the third inverter switching element is turned on, and
   control the first and second inverter switching elements to perform switching according to PWM control while the fourth inverter switching element is turned on.

14. The photovoltaic module according to claim 8, wherein the synchronous rectification unit comprises:
   fifth and eighth switching elements connected in series; and
   first and second capacitors connected in series,
   wherein the output side of the transformer is connected between a third node located between the fifth and eighth switching elements and a fourth node located between the first and second capacitors.

15. The photovoltaic module according to claim 1, wherein the DC-terminal capacitor includes a film capacitor.

* * * * *